[19] United States Patent
Karim et al.

(10) Patent No.: US 7,995,113 B2
(45) Date of Patent: Aug. 9, 2011

(54) HIGH GAIN DIGITAL IMAGING SYSTEM

(75) Inventors: Karim S. Karim, Waterloo (CA);
Farhad Taghibakhsh, Waterloo (CA);
Mohammad Hadi Izadi, Delta (CA)

(73) Assignee: Simon Fraser University, Burnaby (CA)

( * ) Notice: Subject to any disclaimer, the term of this patent is extended or adjusted under 35 U.S.C. 154(b) by 497 days.

(21) Appl. No.: 11/577,637

(22) PCT Filed: Oct. 20, 2005

(86) PCT No.: PCT/CA2005/001610
§ 371 (c)(1),
(2), (4) Date: May 9, 2008

(87) PCT Pub. No.: WO2006/042407
PCT Pub. Date: Apr. 27, 2006

(65) Prior Publication Data
US 2008/0259182 A1    Oct. 23, 2008

Related U.S. Application Data

(60) Provisional application No. 60/620,825, filed on Oct. 20, 2004.

(30) Foreign Application Priority Data

Jan. 8, 2005    (CA) ..................................... 2494602

(51) Int. Cl.
*H04N 5/235*    (2006.01)
*H04N 3/14*    (2006.01)
*H04N 5/335*    (2011.01)
(52) U.S. Cl. .................................... 348/229.1; 348/308
(58) Field of Classification Search ............... 348/229.1, 348/308
See application file for complete search history.

(56) References Cited

U.S. PATENT DOCUMENTS
5,083,016 A    1/1992    Wyles
(Continued)

FOREIGN PATENT DOCUMENTS
JP    08-256293 A    10/1996
(Continued)

OTHER PUBLICATIONS

Office Action dated Oct. 28, 2008, issued in copending U.S. Appl. No. 10/567,832, filed Dec. 18, 2006.
(Continued)

*Primary Examiner* — Sinh Tran
*Assistant Examiner* — Christopher K Peterson
(74) *Attorney, Agent, or Firm* — Christensen O'Connor Johnson Kindness PLLC

(57) ABSTRACT

The present invention provides digital imaging architectures comprising detectors coupled to readout circuitry, wherein the readout circuitry is capable of providing large amplification to small, noise sensitive input signals to improve their noise immunity, as well as capable of providing a fast pixel readout time. The readout circuitry comprises an on-pixel amplification transistor as well as additional transistors used to read out the amplified signal and/or to reset the amplified output signal stored by a portion of the circuit prior to reading a subsequent signal. The present invention also provides readout circuitry that is capable of providing large amplification and thus additional noise immunity to the input signal from the detector by implementing another amplification stage within the readout circuitry. The readout circuitry can function in particular modes, the use of which can depend on characteristics of the input signals transferred to the readout circuitry from the detectors, or can depend on the characteristics of the output signal required from the readout circuitry.

48 Claims, 25 Drawing Sheets

U.S. PATENT DOCUMENTS

| | | | |
|---|---|---|---|
| 5,389,567 | A | 2/1995 | Acovic |
| 5,528,059 | A | 6/1996 | Isogai |
| 5,665,959 | A | 9/1997 | Fossum |
| 5,892,540 | A * | 4/1999 | Kozlowski et al. ............ 348/300 |
| 5,962,856 | A | 10/1999 | Zhao |
| 5,981,932 | A | 11/1999 | Guerrieri |
| 6,130,423 | A * | 10/2000 | Brehmer et al. ............ 250/208.1 |
| 6,194,740 | B1 * | 2/2001 | Zhang et al. .................... 257/59 |
| 6,486,504 | B1 | 11/2002 | Guidash |
| 7,573,518 | B2 * | 8/2009 | Nakamura et al. ............ 348/302 |
| 2002/0114530 | A1 | 8/2002 | Duarte |
| 2002/0134918 | A1 * | 9/2002 | Miida ........................ 250/214.1 |
| 2002/0154225 | A1 * | 10/2002 | Matsumoto et al. ........ 348/229.1 |
| 2002/0171773 | A1 * | 11/2002 | Gower et al. ................. 348/691 |
| 2002/0190215 | A1 * | 12/2002 | Tashiro et al. ............ 250/370.11 |
| 2004/0152268 | A1 | 8/2004 | Chu |
| 2005/0041128 | A1 * | 2/2005 | Baker ........................... 348/308 |
| 2005/0068707 | A1 | 3/2005 | Takada |
| 2006/0027843 | A1 | 2/2006 | Ogura |
| 2006/0146159 | A1 * | 7/2006 | Farrier ......................... 348/308 |
| 2006/0190215 | A1 | 8/2006 | Hsieh |
| 2007/0187609 | A1 | 8/2007 | Karim |
| 2009/0147118 | A1 | 6/2009 | Karim |
| 2009/0268070 | A1 * | 10/2009 | Hosier ......................... 348/301 |

FOREIGN PATENT DOCUMENTS

| | | |
|---|---|---|
| JP | 09051476 A | 2/1997 |
| JP | 10-336525 A | 12/1998 |
| JP | 2000-78463 A | 3/2000 |
| JP | 2002-320146 A | 10/2002 |
| JP | 2003057113 A | 2/2003 |
| JP | 2003-134396 A | 5/2003 |
| JP | 2003-209746 A | 7/2003 |
| WO | 96/34416 A1 | 10/1996 |
| WO | 97/05659 A1 | 2/1997 |
| WO | 00/19706 A1 | 4/2000 |
| WO | 02/067337 A2 | 8/2002 |
| WO | 03/061277 A2 | 7/2003 |
| WO | 03/073507 A2 | 9/2003 |
| WO | 2005/015639 A1 | 2/2005 |

OTHER PUBLICATIONS

Notice of Allowance dated Apr. 10, 2009, issued in copending U.S. Appl. No. 10/567,832, filed Dec. 18, 2006.

Notice of Allowance dated May 29, 2009, issued in copending U.S. Appl. No. 10/567,832, filed Dec. 18, 2006.

Office Action dated Jun. 22, 2009, issued in copending U.S. Appl. No. 10/567,832, filed Dec. 18, 2006.

Notice of Allowance dated Dec. 16, 2009, issued in copending U.S. Appl. No. 10/567,832, filed Dec. 18, 2006.

Huang, Z.-S, and T. Ando, "Temperature Dependence of the Output of a Stacked and Amplified Image Sensor," Japanese Journal of Applied Physics 29(2):L240-L242, Feb. 1990.

Karim, K.S., et al., "Amorphous Silicon Active Pixel Sensor Readout Circuit for Digital Imaging," IEEE Transactions on Electron Devices 50(1):200-208, Jan. 2003.

Karim, K.S., et al., "High Dynamic Range Pixel Architectures for Diagnostic Medical Imaging," in M.J. Yaffe and M.J. Flynn (eds.), "Proceedings of SPIE: Medical Imaging 2004: Physics of Medical Imaging," San Diego, Feb. 15, 2004, vol. 5368, pp. 657-667.

Karim, K.S., and A. Nathan, "On-Pixel Amorphous Silicon Amplifier for Digital Imaging," in M.J. Dean et al. (eds.), "Integrated Optoelectronics," Papers presented at the First International Symposium on Integrated Electronics, Philadelphia, May 12-17, 2002, vol. PV 2002-4, pp. 313-332.

Kavadis, S., et al., A Logarithmic Response CMOS Image Sensor With On-Chip Calibration, IEEE Journal of Solid-State Circuits 35(8):1146-1152, Aug. 2000.

Sanaie-Fard, G., et al., "High Dynamic Range Pixel Amplifier Architecture in Amorphous Silicon Technology for Diagnostic X-Ray Imaging Applications," in Y. Kuo (ed.), "Thin Film Transistor Technologies (TFTT VII)," Papers presented at the 7th Symposium on Thin Film Transistor Technologies, Honolulu, Oct. 3-8, 2004, vol. PV 2004-15, pp. 289-300.

Taghibakhsh, F., and K.S. Karim, "Amplified Pixel Sensor Architectures for Low Dose Computed Tomography Using Silicon Thin Film Technology," in J. Hsieh and M.J. Flynn (eds.), "Proceedings of SPIE: Medical Imaging 2007: Physics of Medical Imaging," San Diego, Feb. 2007, vol. 6510, pp. 65103W-1-65103W-8.

Taghibakhsh, F., and K.S. Karim, "High Dynamic Range 2-TFT Amplified Pixel Sensor Architecture for Digital Mammography Tomosynthesis," IET Circuits, Devices & Systems 1(1):87-92, Feb. 2007.

Karim, K.S., et al., "Active Pixel Sensor Architectures in a-SiH for Medical Imaging," Journal of Vacuum Science and Technology. A. Vacuum, Surfaces, and Films 20(3):1095-1099, May/Jun. 2002.

Karim, K.S., et al., "Alternate Pixel Architectures for Large Area Medical Imaging," in L.E. Antonuk and M.J. Yaffe (eds.), "Medical Imaging 2001: Physics of Medical Imaging," Proceedings of SPIE 4320:35-46, 2001.

Karim, K.S., et al., "Amorphous Silicon Pixel Amplifier With DeltaVT Compensation for Low Noise Digital Fluoroscopy," International Electron Devices Meeting (IEDM '02) Digest, 2002, pp. 215-218.

Karim, K.S., and A. Nathan, "Active Pixel TFT Array for Digital Imaging Applications," Proceedings of the 198th Meeting of the Electrochemical Society Symposium, Phoenix, Oct. 22-27, 2000, vol. 2000, No. 31, pp. 320-332.

* cited by examiner

US 7,995,113 B2

HIGH GAIN DIGITAL IMAGING SYSTEM

FIELD OF THE INVENTION

The present invention pertains to the field of digital imaging, and in particular, to digital imaging systems capable of providing large amplification, high dynamic range and fast pixel readout time.

BACKGROUND

Active matrix flat-panel imagers (AMFPIs) have gained considerable significance in digital imaging, and more recently in diagnostic medical imaging applications, in view of their large area readout capability. The pixel, forming the fundamental unit of the active matrix, comprises a detector and readout circuit to efficiently transfer the collected electrons to external electronics for data acquisition. The pixel architecture most commonly used for large area x-ray imaging is the passive pixel sensor (PPS) shown in FIG. 1a. Here, a detector, for example, an amorphous selenium (a-Se) based photoconductor or a Cesium Iodide (CsI) phosphor coupled to an amorphous silicon (a-Si:H) p-i-n photodiode, is integrated with a readout circuit comprising an a-Si:H thin-film transistor (TFT) switch. Signal charge is accumulated on the pixel capacitance during an integration cycle and is transferred to an external charge amplifier via the TFT switch during a readout/reset cycle. This capacitance is the p-i-n photodiode capacitance or an integrated storage capacitor for the a-Se photoconductor arrangement. FIG. 1b shows a timing diagram for one sequence of operation of a PPS pixel. Cycle 110 and 120 represent the integration cycle and readout/reset cycle, respectively. Other sequences are possible, for example, where double sampling mechanisms are introduced, wherein double sampling mechanisms are typically used to correct for the effect of non-uniforrities within the circuitry. These non-uniformities may comprise process non-uniformities in the form of offsets, and, in the case of a-Si:H technology, non-uniformities in pixel circuit performance due to transistor instability. For example, International Publication Nos. WO9634416 and WO9705659 further disclose flat-panel detectors for radiation imaging using a PPS architecture.

While the PPS has the advantage of being compact and thus amenable to high-resolution imaging, reading a small output signal of the PPS for low input, real-time, large area applications, such as low dose fluoroscopy, requires high performance off-panel column charge amplifiers. These charge amplifiers can potentially introduce noise that degrades the signal-to-noise ratio (SNR) at low signal levels thus undermining the pixel dynamic range. In particular, fluoroscopy can be one of the most demanding applications for flat-panel imaging systems due to the requirement of real-time readout. Real-time x-ray imaging or fluoroscopy is used in many medical interventional procedures where a catheter is moved through the arterial system under x-ray guidance. The technical challenge to be addressed for these types of fluoroscopy is the need for extremely low noise, or alternatively, an increase in signal size before readout. Studies on a-Si:H PPS pixels suggest that an improvement in SNR of an order of magnitude is desirable in order to apply these systems to more advanced imaging applications.

One approach for improved SNR is disclosed in International Publication No. WO02067337 which discloses that the SNR can be increased by employing in-situ, or pixel, amplification via an a-Si:H current-mediated active pixel sensor (C-APS) as depicted in FIG. 2a. The gain, linearity and noise results reported show an improvement and indicate that the a-Si:H C-APS, coupled together with an established x-ray detection technology such as a-Se or CsI/p-i-n photodiodes, can meet the stringent noise requirements for digital x-ray fluoroscopy, which is less than 1000 electrons of noise.

To perform amplification of a small, noise vulnerable, input signal, such as in fluoroscopy, the C-APS pixel can be used in three operating cycles; a reset cycle, an integration cycle and a readout cycle. FIG. 2b illustrates a timing diagram for a method of operating the C-APS readout circuit employing a double sampling mechanism. In this sequence, during the integration cycle 210, READ transistor 24 and RESET transistor 21 are kept OFF while AMP_RESET transistor 27 is kept ON. Photons incident upon detector 22 result in the generation of electron-hole pairs that discharge, or charge, the capacitance $C_{DETECTOR}$ at node 201 and thus reduce, or increase, the voltage at node 201, $V_G$, by an amount $\Delta V_G$. $C_{DETECTOR}$ mainly comprises the detector 22 capacitance and any storage capacitors that may be used.

The readout cycle 220 follows the integration cycle 210 and during this cycle, READ transistor 24 is turned ON, RESET transistor 21 is kept OFF and the AMP_RESET transistor 27 is turned OFF, resulting in a current, $I_{bias} \pm I_{bias}$, that is proportional to $V_G \pm \Delta V_G$ flowing in the AMP transistor 23 and READ transistor 24 branch. The current, $I_{bias} \pm I_{bias}$ is then integrated by charge amplifier 25 to obtain and store an output voltage, $V_{OUT1}$, on the amplifier feedback capacitor 26.

The reset cycle 230 occurs subsequent to the readout cycle 220 where RESET transistor 21 is pulsed ON and $C_{DETECTOR}$ is charged, or discharged, to reset the voltage at node 201 to $V_G$ while RESET transistor 21 is ON. During this reset cycle, READ transistor 24 is turned OFF and AMP_RESET transistor 27 is turned ON.

To perform the double sampling operation, an additional read cycle 240 follows the reset cycle 230 where again READ transistor 24 is turned ON, RESET transistor 21 is turned OFF and AMP_RESET transistor 27 is turned OFF. $I_{bias}$ is integrated by charge amplifier 25 to obtain and store an output voltage, $V_{OUT2}$, on feedback capacitor 26. Subtracting $V_{OUT1}$ from $V_{OUT2}$ yields a $\Delta V_{OUT}$ that can be free from non-uniformities and is proportional to $\Delta VG$.

$\Delta I_{bias}$ is proportional to $\Delta V_G$ and is given as:

$$\Delta I_{bias} = g_m \Delta V_G$$

where $g_m$ is the transconductance of the AMP transistor 23 and READ transistor 24 readout circuit branch.

The C-APS produces a charge gain, $G_i$, to amplify the noise vulnerable input signal. The $G_i$ for the C-APS is given as:

$$G_i = (g_m T_S)/C_{DETECTOR}$$

where $T_S$ is the amount of time $I_{bias}$ and $\Delta I_{bias}$ are integrated on the feedback capacitor 26. As indicated by the equation above, $G_i$ is programmable via $g_m$, $T_S$ and the choice of an appropriate $C_{DETECTOR}$.

A concern with the C-APS circuit is the presence of a small-signal linearity constraint on the x-ray input signal. Using such a pixel amplifier for real-time fluoroscopy where the exposure level is small, is feasible since the voltage change at the amplifier input is also small and in the order of mV. However, in applications such as digital chest radiography, mammography or higher dose fluoroscopy, the voltage change at the amplifier input can be much larger due to the larger x-ray exposure levels, which can cause the C-APS pixel output to be non-linear thus reducing the pixel dynamic range. Another consequence of a non-linear pixel transfer function is that the standard double sampling mechanism cannot be implemented in hardware due to this non-linearity.

One solution to the problem of low dynamic range is to implement a multi-mode pixel architecture as disclosed in International Publication No. WO2005015639. In such a multi-mode pixel architecture, the readout circuitry functions in different modes, the selection of which can depend on the characteristics of the input signal transferred to the readout circuitry from the detector. For example, when the input signal has a particular magnitude or range of magnitudes the readout circuitry can function in a first mode wherein the input signal can be amplified, and when the input signal has a different magnitude or range of magnitudes the readout circuitry can function in an alternate mode wherein the signal can be read out with a different or no amplification.

Furthermore, an additional shortcoming of the C-APS pixel is that the presence of a large output current can cause the external or off-panel charge amplifier to saturate. Large pixel output currents can also occur when a large charge gain is required since $g_m$ is proportional to $I_{bias}$. International Publication No. WO2005015639 further discloses the use of a current subtraction circuit to deal with saturation of the amplifier, however this requires additional off-panel correction circuitry for offsets between pixels, which can add cost to the system as well as introduce undesired noise to the output signal.

Another approach disclosed in International Publication No. WO02067337 reports a near-unity gain pixel amplifier, namely, an a-Si:H voltage-mediated active pixel sensor V-APS). A V-APS architecture is illustrated in FIG. 3. READ transistor 34, AMP transistor 33 and RESET transistor 31 are components of the V-APS pixel and function in a similar manner as in the C-APS pixel. Resistive load 35 is connected to the pixel output node to convert the current in the AMP transistor 33 and READ transistor 34 branch into an output voltage. Resistive load 35 can comprise a resistor load device or a transistor load device. The input signal voltage $V_G$ is translated to a pixel output voltage $V_{OUT}$ with a near unity gain. The V-APS, like the C-APS, can be used in three operating cycles; a reset cycle, an integration cycle and a readout cycle. Like the C-APS, double sampling mechanisms can be applied to the V-APS to correct for the effect of non-uniformities within the circuitry. A problem with the V-APS architecture is that essentially no gain is provided to the input signal. In addition, with current state of the art amorphous silicon technology, it is difficult to achieve real time readout using this architecture when large column bus capacitances are charged and discharged.

Therefore, there is a need for pixel designs that are able to achieve real-time readout as well as achieve high gain to detect small noise-vulnerable signals with a large signal-to-noise ratio while being capable of sensing a wide range of input signals. In addition, there is also a need for a pixel design that reduces the effect of offsets between pixels.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a high gain digital imaging system. In accordance with an aspect of the present invention there is provided a digital imaging apparatus comprising: a detector for generating a first signal in response to photons incident thereupon; and readout circuitry coupled to said detector for receiving said first signal and for generating a second signal representative of said first signal, said readout circuitry comprising a first on-pixel amplifier; wherein said second signal is subsequently output from said digital imaging apparatus.

In accordance with another aspect of the invention, there is provided a digital imaging system comprising an array of digital imaging apparatuses, each digital imaging apparatus comprising: a detector for generating a first signal in response to photons incident thereupon; and readout circuitry coupled to said detector for receiving said first signal and for generating a second signal representative of said first signal, said readout circuitry comprising a first on-pixel amplifier; wherein said second signal is subsequently output from said digital imaging apparatus.

In accordance with another aspect of the present invention, there is provided a method for digital imaging comprising the steps of: detecting by a detector photons incident thereupon; generating by the detector a first signal in response to the photons; receiving said first signal by readout circuitry coupled to the detector; generating a second signal representative of the first signal by the readout circuitry, said readout circuitry including a first on-pixel amplifier; and transferring said second signal to a digital signal processor.

BRIEF DESCRIPTION OF THE FIGURES

FIG. 1b illustrates an example of a timing diagram for the PPS of FIG. 1a.

FIG. 2b illustrates an example of a timing diagram for the C-APS of FIG. 2a.

FIG. 4b illustrates an example of a timing diagram for the embodiment of FIG. 4a.

FIG. 5b illustrates an example of a timing diagram for the embodiment of FIG. 5a.

FIG. 7b illustrates an example of a timing diagram for the embodiment of FIG. 7a.

FIG. 8b illustrates an example of a timing diagram for the embodiment of FIG. 8a.

FIG. 9b illustrates an example of a timing diagram for the embodiment of FIG. 9a.

FIG. 10b illustrates an example of a timing diagram for the embodiment of FIG. 10a.

FIG. 12b illustrates an example of a timing diagram for the embodiment of FIG. 12a.

DETAILED DESCRIPTION OF THE INVENTION

Definitions

Figure 1A:
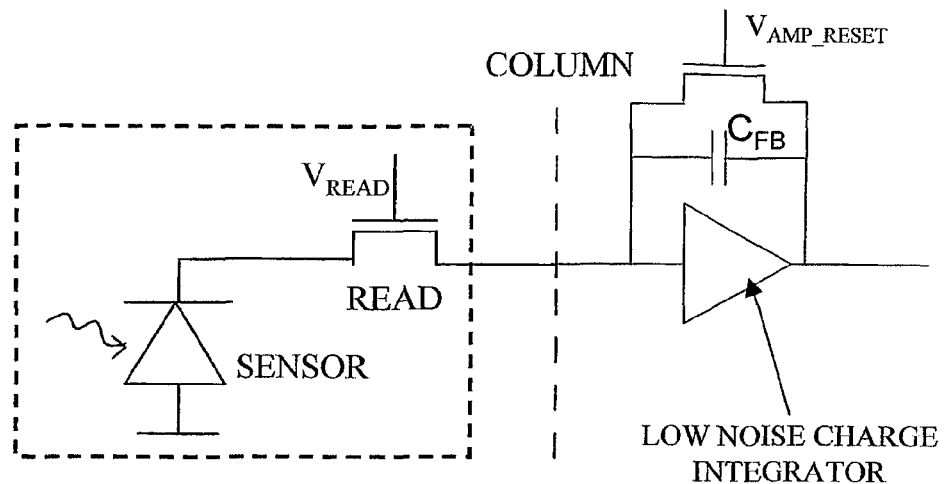
FIG. 1a illustrates a passive pixel sensor (PPS) according to the prior art.
Figure 1B:
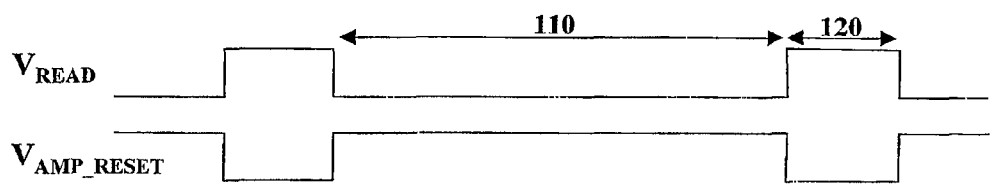

The term "detector" is used to define a device that converts photons of electromagnetic radiation to electrical charge. This radiation may be of any wavelength or range of wavelengths from any portion of the electromagnetic spectrum. For example, x-ray photons, ultraviolet photons, infrared photons, or any other photons as would be readily understood may be converted to electrical charge by such a device.

The term "sensor" is used to define the combination of one or more detectors and readout circuitry.

The term "unity gain" is used to define current or voltage gain, such that the output signal obtained as a result of the gain being applied to an input signal has the same magnitude or a different magnitude than the input signal.

Unless defined otherwise, all technical and scientific terms used herein have the same meaning as commonly understood by one of ordinary skill in the art to which this invention belongs.

The present invention provides digital imaging architectures comprising detectors coupled to readout circuitry, wherein the readout circuitry is capable of providing large amplification to small, noise sensitive input signals to improve their noise immunity, as well as capable of providing a fast pixel readout time. Each detector generates photo-carriers in response to photons incident upon the detector and produces charge, which results in a voltage change across the detector. This voltage change produces the input signal to the readout circuitry, which then outputs a current or charge representative of the input signal. The readout circuitry comprises an on-pixel amplification transistor as well as additional transistors used to read out the amplified signal and/or to reset the amplified output signal stored by a portion of the circuit prior to reading a subsequent signal, wherein the read transistors and reset transistors are able to occupy various positions within the readout circuitry. More than one transistor as well as additional components, such as resistors, inductors and capacitors, may also be used in addition to the amplification transistor for amplification. Power sources and components such as resistors, inductors and capacitors, in addition to the amplification, read and reset transistors may also be implemented in the readout circuitry. For example, in one embodiment of the present invention, an independently programmable current source is implemented in the readout circuitry and plays a role in effectively reducing the total amount of current flowing through parts of the readout circuitry which can saturate, for example, when a large charge gain is used. Therefore, in this embodiment the pixel architecture used inherently prevents saturation and eliminates the need for additional off-panel correction circuitry for offsets between pixels. As a result this embodiment further provides a digital imaging system with a large dynamic range of detection.

In another embodiment of the present invention, the readout circuitry is capable of providing large amplification and thus additional noise immunity to the input signal from the detector by implementing another amplification stage within the readout circuitry. In one embodiment the voltage change produced across the detector produces the input signal to the first amplification stage, or pre-amplification stage. The output signal from the pre-amplification stage forms the input signal to the second amplification stage, or the amplification transistor, which then provides an output signal with a larger gain than would have been obtained with solely the amplification transistor. Additional amplification stages may also be implemented however, this may increase the complexity of the circuitry.

In various embodiments of the present invention, the readout circuitry can function in particular modes, the use of which can depend on characteristics of the input signals transferred to the readout circuitry from the detectors, or can depend on the characteristics of the output signal required from the readout circuitry. For example, when the input signal has a particular magnitude or range of magnitudes, the readout circuitry can function in a first mode in which the input signal can be amplified to a specific level, and when the input signal has a magnitude or range of magnitudes, the readout circuitry can function in an alternate mode in which the input signal can be read out with a different or no amplification. For implementations of the present invention in applications such as low dose fluoroscopy, high dose fluoroscopy, chest radiography and mammography, two modes can provide a sufficient dynamic range for these x-ray detection techniques, or other detection techniques as would be readily understood. Additional modes can be implemented to provide various levels of amplification to the input signal, for example, three or more modes of operation of the readout circuitry can be implemented. Furthermore, more than one mode can be used to read out the same input signal. In addition, some embodiments may function in both a single mode and a dual mode without any modifications to the readout circuitry. In some embodiments, selection of the mode of operation of the readout circuitry may be actuated manually or automatically. For example, an automated switching system can comprise a feedback circuit enabling automatic selection of an appropriate mode of operation of the readout circuitry, or a pre-programmed sequence to enable automatic selection of an appropriate mode of operation of the readout circuitry, or any other means of enabling automatic selection of an appropriate mode of operation of the readout circuitry as would be readily understood. Thus the digital imaging apparatus and system of the present invention can provide a large dynamic range of detection that can be capable of amplifying sensitive input signals from a detector to improve the noise immunity of the input signals to external noise sources as well as capable of reading larger signals with little or no amplification, both with a fast pixel readout time.

Each pixel comprises one detector, however it is contemplated that more than one detector may be present within each pixel. In addition, the readout circuitry may be partially present within the on-panel pixels and partially present off the imaging panel, or substantially present on the imaging panel. The imaging panel may be rigid, for example comprising a rigid glass or rigid metal substrate, or flexible, for example comprising a flexible plastic or flexible metal substrate. In addition, the present invention may comprise more than one imaging panel. For example, one panel may comprise some parts of the sensor and another panel may comprise other parts of the sensor. Furthermore, the pixel electronics may be fabricated on a single chip or on multiple chips. Furthermore, the readout circuitry present within a pixel may be physically located in the same plane as the detector or this readout circuitry may be embedded under, or fabricated above, the detector to provide a high fill factor.

Portions of the readout circuitry that are common for a column, row, or group of pixels may be multiplexed between these pixels in an array. Thus it would be readily understood by a worker skilled in the art, that in the various embodiments of the present invention, common column, row or group readout circuitry may be multiplexed between pixels, and that this may require additional circuitry, for example switching circuits or multiplexing circuits. In addition, multiplexers may also be used to reduce the readout circuit complexity by decreasing the total number of amplifiers, for example, required for a column, row, or group of pixels. Furthermore, common column or row readout circuitry may also be implemented such that the common readout circuitry is individual to each pixel. It would also be understood that the pixels of various embodiments may be implemented in arrays of any size. Furthermore, where portions of readout circuitry have been identified as being shared by one or more columns of pixels, it should be understood that the circuitry may equivalently be shared by one or more rows of pixels or one or more other groups of pixels.

Embodiments of the present invention can be operated with various switching and timing sequences. For example, where a double sampling technique is used, the transistor switching and timing may vary from a sequence in which no double sampling technique is used. In various embodiments of the present invention described herein, related transistor switching and timing cycles and sequences are provided as examples, and numerous other cycles and sequences are possible and some sequences may have advantages over others as would be obvious to a worker skilled in the art.

The detector may be any type of detector, for example, solid-state photodetectors such as a-Si:H, amorphous selenium or cadmium zinc telluride based detectors or any other appropriate detector. In addition, direct detection based detectors such as molybdenum Schottky diodes, as well as indirect detection detectors such as those comprising phosphors for example gadolinium oxysulfide detectors, or caesium iodide detectors, may also be used. Any other types of detectors for radiation detection may further be used as would be readily understood by a worker skilled in the art. The transistors used in various embodiments of the present invention may be amorphous silicon (a-Si:H) thin-film transistors (TFTs), poly-crystalline silicon TFTs, micro-crystalline silicon TFTs, nano-crystalline silicon TFTs, crystalline silicon transistors, or any other similar device as would be readily understood by a worker skilled in the art. In addition, the transistors may be n-type, p-type or ambi-polar. In further embodiments, radiation in any region of the electromagnetic spectrum may be detected using the present invention with the selection of detectors, and devices for the readout circuitry being made in order that an appropriate portion of the electromagnetic spectrum can be detected as would be readily understood by a worker skilled in the art.

As would be readily understood by a worker skilled in the art, the present invention may be applied to any digital imaging application. For example, the present invention may be applied to medical imaging, x-ray inspection systems such as in the inspection of aircraft wings, security systems such as screening of luggage at airports, non-destructive material tests, radiography, tomosynthesis or optical imaging, as well as other forms of digital imaging applications as would be readily understood.

Pixel Architectures

Figure 4A:
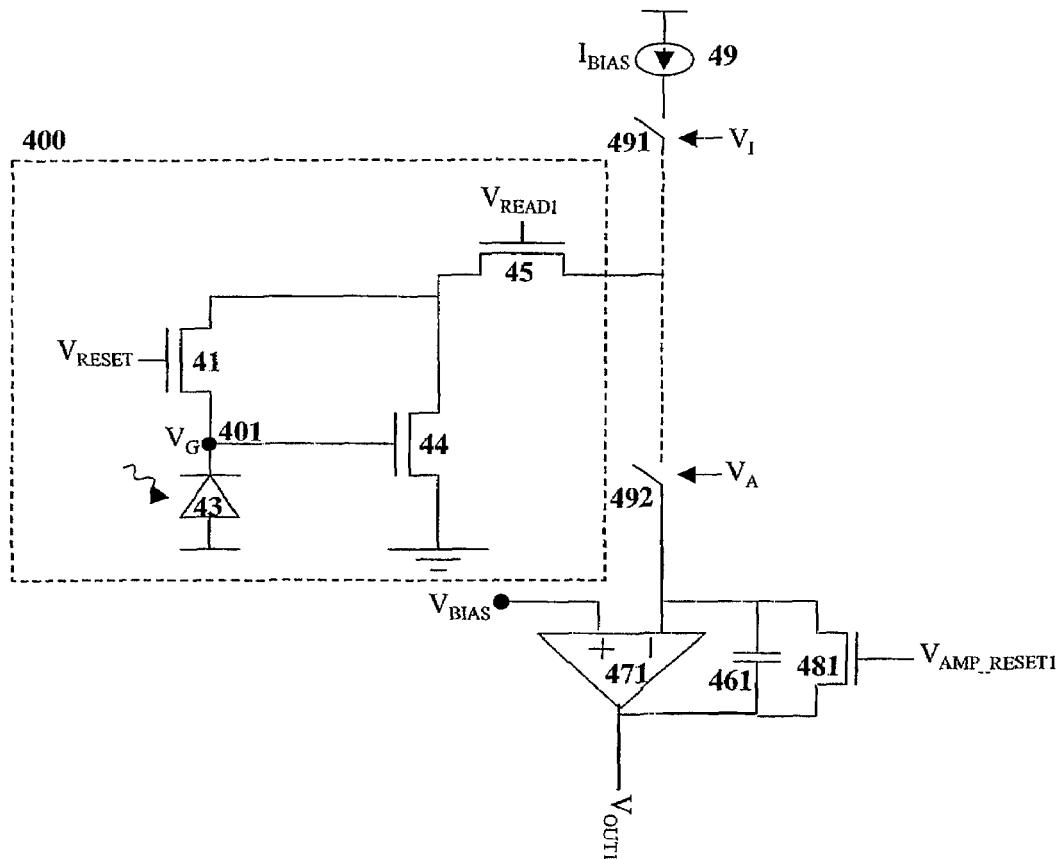
FIG. 4a illustrates an imaging architecture according to one embodiment of the present invention comprising a three transistor pixel implementation.

FIG. 4a illustrates an imaging architecture according to one embodiment of the present invention. In this embodiment, RESET transistor 41, READ1 transistor 45, detector 43 and AMP transistor 44 are present within each pixel 400 on the imaging panel. Charge integrator 471, feedback capacitor 461, AMP_RESET1 transistor 481, independently controllable current source 49, switch 491, and switch 492 form part of the off-pixel readout circuitry. Each of the above components may be off-panel components or on-panel components.

Figure 4B:
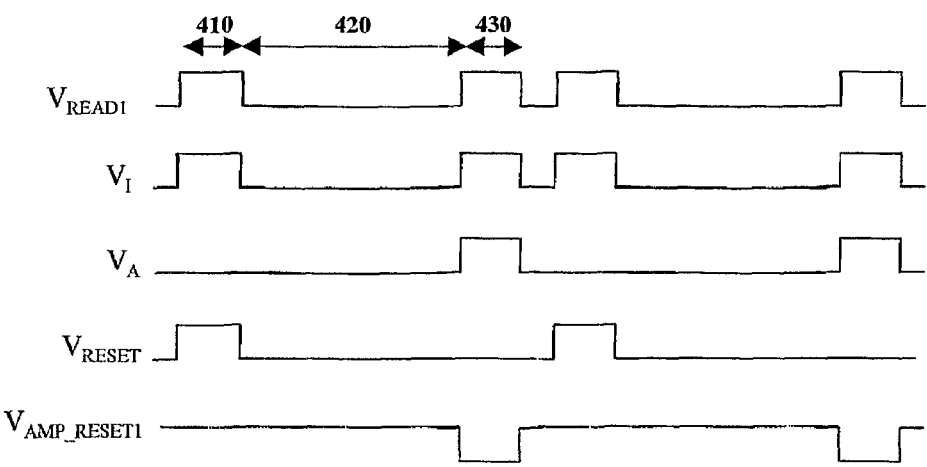

FIG. 4b illustrates an example of a timing diagram for a sequence in which an input signal from detector 43 is read out. In this sequence, three cycles are used, namely, a reset cycle 410, an integration cycle 420, and a readout cycle 430. As would be readily understood by a worker skilled in the art, subsequent signal processing methods can be used to interpret the readout circuitry output signals. For example, where the input signal is outside the dynamic range of a particular mode, this would be appropriately interpreted by the signal processing means.

During the reset cycle 410, switch 491 is pulsed closed, and READ1 transistor 45, and RESET transistor 41 are pulsed ON, during which time a capacitance $C_{DETECTOR}$ is charged, or discharged, to reset the voltage at node 401 to $V_G$. $C_{DETECTOR}$ is the capacitance at node 401 and comprises the detector capacitance and any storage capacitors that may be used. The voltage $V_G$ is proportional to the current $I_{BIAS}$ generated by current source 49. Once the voltage at node 401 is charged up to $V_G$, all the current $I_{BIAS}$ flows through the READ1 transistor 45 and AMP transistor 44 branch. During this reset cycle, switch 492 is kept open and AMP_RESET1 transistor 481 is kept ON to prevent buildup of any leakage currents on feedback capacitor 461.

The integration cycle 420 occurs subsequent to the reset cycle 410. During this integration cycle, switch 491 is opened, READ1 transistor 45 and RESET transistor 41 are turned OFF, AMP_RESET1 transistor 481 is kept ON, and switch 492 is kept open. Photons incident upon detector 43 result in the generation of electron-hole pairs that discharge, or charge, the capacitance $C_{DETECTOR}$ and thus reduce, or increase, the voltage at node 401, $V_G$, by an amount $\Delta V_G$.

The readout cycle 430 follows the integration cycle 420 and during this readout cycle, READ1 transistor 45 is turned ON and RESET transistor 41 is kept OFF. AMP_RESET1 transistor 481 is turned OFF and switch 492 is closed to enable integration of the amplified input signal on feedback capacitor 461. Switch 491 is also closed and enables the current $I_{BIAS}$ to flow through the readout circuitry. The circuit configuration, as would be readily understood by a worker skilled in the art, can cause the current $I_{BIAS}$ to flow preferentially through the READ1 transistor 45 and AMP transistor 44 branch to ground. The total amount of current, $I_{SIG}$, that flows through the READ1 transistor 45 and AMP transistor 44 branch is determined by the voltage at node 401 after the integration cycle. Thus, the current difference, $I_{DIFF}$, between $I_{BIAS}$ and $I_{SIG}$ is the amount of current that flows to charge integrator 471, which consequently produces an output voltage $V_{OUT1}$. $V_{OUT1}$ represents the amplified input signal that can be subsequently recorded and manipulated by signal processors, as would be readily understood by a worker skilled in the art. $I_{DIFF}$ will be small if $\Delta V_G$ is in the small signal region and here $I_{DIFF}$ is linearly proportional to $\Delta V_G$ and is given by:

$$I_{DIFF} = g_m \Delta V_G$$

where $g_m$ is the transconductance of AMP transistor 44.

The circuit produces a charge gain, $G_i$, to amplify the input signal, which may be vulnerable to noise. The $G_i$ for this circuit is given as:

$$G_i = (g_m T_S) / C_{DETECTOR}$$

where $T_S$ is the amount of time $I_{DIFF}$ is integrated on feedback capacitor 461. As can be seen from the equation above, $G_i$ is programmable via the $g_m$, $T_S$, and choice of appropriate $C_{DETECTOR}$.

Therefore, an advantage of this circuit is that $I_{BIAS}$ and $I_{SIG}$ can be increased to large values in order to achieve a large $g_m$, without causing saturation of charge amplifier 471. During operation typically small $I_{DIFF}$ currents are achieved thus mitigating the problem of amplifier saturation as is seen in prior art readout circuits. In addition, since the pixel output can be linear, the effect of non-uniformities in the imager fabrication process, transistor metastability, and external circuit non-uniformity can be mitigated by the use of standard double sampling and offset-and-gain correction techniques commonly applied in imaging as would be readily understood by a worker skilled in the art.

In an alternate sequence of use of the embodiment of FIG. 4a, switch 491 may be kept open to prevent $I_{BIAS}$ from flowing through the readout circuitry. In this case, $V_{BIAS}$ would be set to an appropriate value for the charge amplifier 471 to integrate all the current flowing through READ1 transistor 45 during the readout cycle.

Figure 5A:
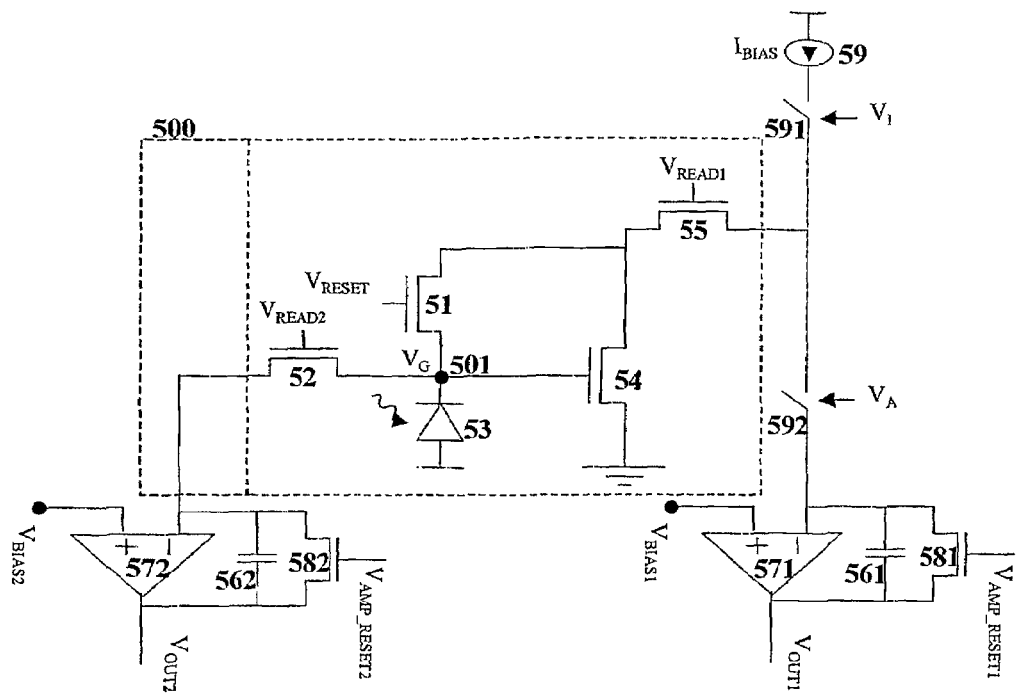
FIG. 5a illustrates an imaging architecture according to one embodiment of the present invention comprising a four transistor, dual mode pixel implementation.

FIG. 5a illustrates an imaging architecture according to one embodiment of the present invention in which the readout circuitry is partially similar to the embodiment of FIG. 4a and can function in two modes. In this embodiment, the readout circuitry can function in an amplification mode when the input signal can be relatively small, for example in applications such as low dose, real-time, x-ray fluoroscopy, and can function in a unit gain mode when the input signal can be relatively large, for example in higher contrast imaging applications like higher energy, real-time, x-ray fluoroscopy or chest radiography. In the embodiment of FIG. 5a, RESET transistor 51, READ1 transistor 55, detector 53, AMP transistor 54, and READ2 transistor 52 are present within each pixel 500 on the imaging panel. Charge integrator 571, feedback capacitor 561, AMP_RESET1 transistor 581, charge integrator 572, feedback capacitor 562, AMP_RESET2 transistor 582, switch 591 and switch 592 form part of the off-pixel readout circuitry. Each of the detector and readout circuit components may be off-panel components or on-panel components.

The input signal from detector 53 can be read out using either the amplification or unity gain mode, or both of these modes. As would be readily understood by a worker skilled in the art, additional switching circuitry may be implemented for isolation of each mode of operation, if so desired. Both the amplification mode and the unity gain mode can be used to readout the same input signal since during the amplification mode the signal readout is essentially 'non-destructive' to the input signal, and therefore the input signal can remain available for subsequent readout in the unity gain mode. Due to the 'destructive' nature of the readout during the unity gain mode, this mode of readout is typically performed subsequent to the amplification mode readout. To operate the sensor solely in the amplification mode for small, noise vulnerable, input signal acquisition, READ2 transistor 52 is kept OFF. In this mode, the readout circuitry can function in a reset, integration and readout cycle. To operate the sensor solely in the unity gain mode, READ1 transistor 55 and RESET transistor 51 are kept OFF, and switches 591 and 592 are kept open. In this mode the readout circuitry can function in a reset/readout cycle and an integration cycle.

Figure 5B:
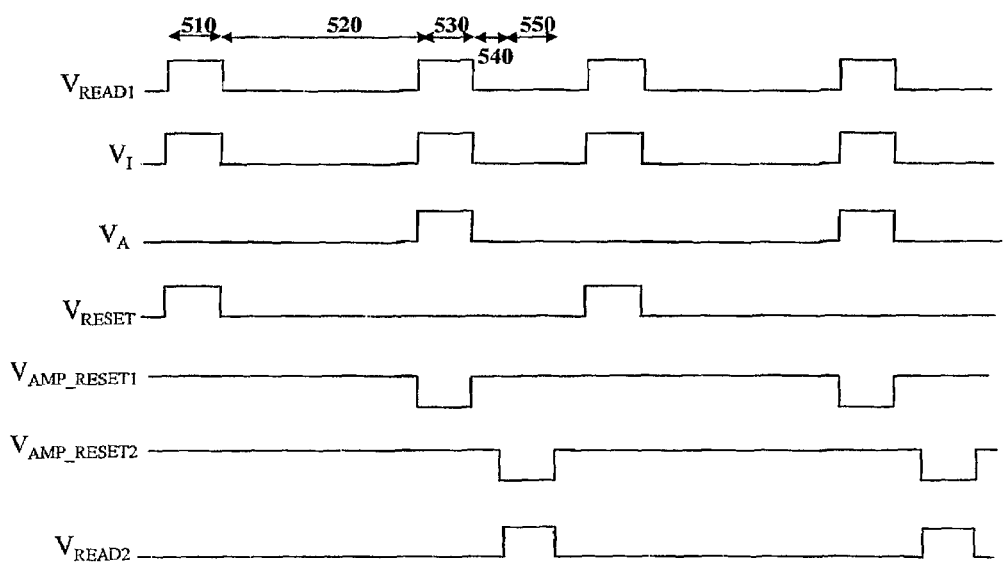

FIG. 5b illustrates an example of a timing diagram for a sequence in which each input signal from detector 53 is read out in the amplification mode followed by the unity gain mode. In this sequence, five cycles are used, namely, a reset cycle 510, an integration cycle 520, an amplification mode readout cycle 530, a charge amplifier reset cycle 540, and a unity gain mode readout cycle 550. As would be readily understood by a worker skilled in the art, subsequent signal processing methods can be used to interpret the readout circuitry output signals. For example, where the input signal is outside the dynamic range of a particular mode, this would be appropriately interpreted by the signal processing means.

During the reset cycle 510 READ2 transistor 52 is kept OFF, switch 591 is pulsed closed, and READ1 transistor 55, and RESET transistor 51 are pulsed ON, during which time a capacitance $C_{DETECTOR}$ is charged, or discharged, to reset the voltage at node 501 to $V_G$. $C_{DETECTOR}$ is the capacitance at node 501 and mainly comprises the detector capacitance and any storage capacitors that may be used, as would be readily understood by a worker skilled in the art. The voltage $V_G$ is proportional to the current $I_{BIAS}$ generated by current source 59. Once the voltage at node 501 is charged up to $V_G$, all the current $I_{BIAS}$ flows through the READ1 transistor 55 and AMP transistor 54 branch. During this reset cycle, switch 592 is kept open and AMP_RESET1 transistor 581 and AMP_RESET2 transistor 582 are kept ON to prevent build-up of any leakage currents on feedback capacitor 561 and feedback capacitor 562, respectively.

The integration cycle 520 occurs subsequent to the reset cycle 510. During this integration cycle, switch 591 is opened, READ1 transistor 55, READ2 transistor 52 and RESET transistor 51 are turned OFF, AMP_RESET1 transistor 581 and AMP_RESET2 transistor 582 are kept ON, and switch 592 is kept open. Photons incident upon detector 53 result in the generation of electron-hole pairs that discharge, or charge, the capacitance $C_{DETECTOR}$ and thus reduce, or increase, the voltage at node 501, $V_G$, by an amount $\Delta V_G$.

The amplification mode readout cycle 530 follows the integration cycle 520 and during this amplification mode readout cycle, READ2 transistor 52 is kept OFF, AMP_RESET2 transistor is kept ON, READ1 transistor 55 is turned ON and RESET transistor 51 is kept OFF. AMP_RESET1 transistor 581 is turned OFF, and switch 592 is closed to enable integration of the amplified input signal on feedback capacitor 561. Switch 591 is also closed and enables the current $I_{BIAS}$ to flow through the readout circuitry. The circuit configuration can cause the current $I_{BIAS}$ to flow preferentially through the READ1 transistor 55 and AMP transistor 54 branch to ground. The total amount of current, $I_{SIG}$, that flows through the READ1 transistor 55 and AMP transistor 54 branch is determined by the voltage at node 501 after the integration cycle. Thus, the current difference, $I_{DIFF}$, between $I_{BIAS}$ and $I_{SIG}$ is the amount of current that flows to charge integrator 571, which consequently produces an output voltage $V_{OUT1}$. $V_{OUT1}$ represents the amplified input signal that can be subsequently recorded and manipulated by signal processors, as would be readily understood by a worker skilled in the art.

Again, $I_{DIFF}$ will be small if $\Delta V_G$ is in the small signal region and here $I_{DIFF}$ is linearly proportional to $\Delta V_G$ and is given by:

$$I_{DIFF} = g_m \Delta V_G$$

where $g_m$ is the transconductance of AMP transistor 54.

As in the embodiment of FIG. 4a, this circuit produces a charge gain, $G_i$, to amplify the input signal, which may be vulnerable to noise. The $G_i$ for this circuit is given as:

$$G_i = (g_m T_S)/C_{DETECTOR}$$

where $T_S$ is the amount of time $I_{DIFF}$ is integrated on feedback capacitor 561. As can be seen from the equation above, $G_i$ is programmable via the $g_m$, $T_S$, and choice of appropriate $C_{DETECTOR}$.

Therefore, this embodiment similarly has the advantage being able to increase $I_{BAS}$ and $I_{SIG}$ to large values in order to achieve a large $g_m$, without causing saturation of charge amplifier 571. In addition, since the pixel output can be linear, the effect of non-uniformities in the imager fabrication process, transistor metastability, and external circuit non-uniformity can be mitigated by the use of standard double sampling and offset-and-gain correction techniques commonly applied in imaging as would be readily understood by a worker skilled in the art.

The charge amplifier reset cycle 540 follows the amplification mode readout cycle 530 where, during the charge amplifier reset cycle READ1 transistor 55 is turned OFF, RESET transistor 51 is kept OFF, READ2 transistor 52 is kept OFF, AMP_RESET2 transistor 582 is kept ON and the AMP_RESET1 transistor 581 is turned ON, with switches 591 and 592 both open. Thus, the output for charge amplifier 572 is reset. The charge amplifier reset cycle 540 may only be needed when there is an adjacent pixel that has multiplexed its READ2 transistor output with the READ1 transistor 55 output of the current pixel 500 as would be readily understood by a worker skilled in the art.

The unity gain mode readout cycle 550 follows the charge amplifier reset cycle 540 and during this unity gain mode readout cycle, READ2 transistor 52 is turned ON, READ1 transistor 55 and RESET transistor 51 are kept OFF, AMP_RESET1 transistor 581 is kept ON and AMP_RESET2 transistor 582 is turned OFF. In this example, switch 591 and switch 592 are both kept open. READ2 transistor 52 is multiplexed to both read out the input signal and reset the voltage $V_G$ at the pixel node 501 by setting $V_{BIAS2}$ to an appropriate reset voltage such as $V_{DD}$ during the unity gain mode readout cycle 550. During all other cycles, $V_{BIAS2}$ may be set to a voltage such as ground. During the unity gain mode readout cycle 550, the voltage $V_G$ at node 501 is transferred and stored on feedback capacitor 562 and appears as an output voltage $V_{OUT2}$. $V_{OUT1}$ represents the input signal with a unity gain that may be subsequently recorded and manipulated by signal processors, as would be readily understood by a worker skilled in the art. In a further embodiment, some gain may be applied to the input signal in the unity gain mode by using appropriate values for feedback capacitor 562. Subsequent signal processing methods can be used to interpret the readout circuitry output signals.

In an alternate sequence of use of the embodiment of FIG. 5a, switch 591 may be kept open to prevent $I_{BIAS}$ from flowing through the readout circuitry. In this case, $V_{BIAS}$ would be set to an appropriate value for the charge amplifier 571 to integrate all the current flowing through READ1 transistor 55 during the readout cycle.

Figure 5C:
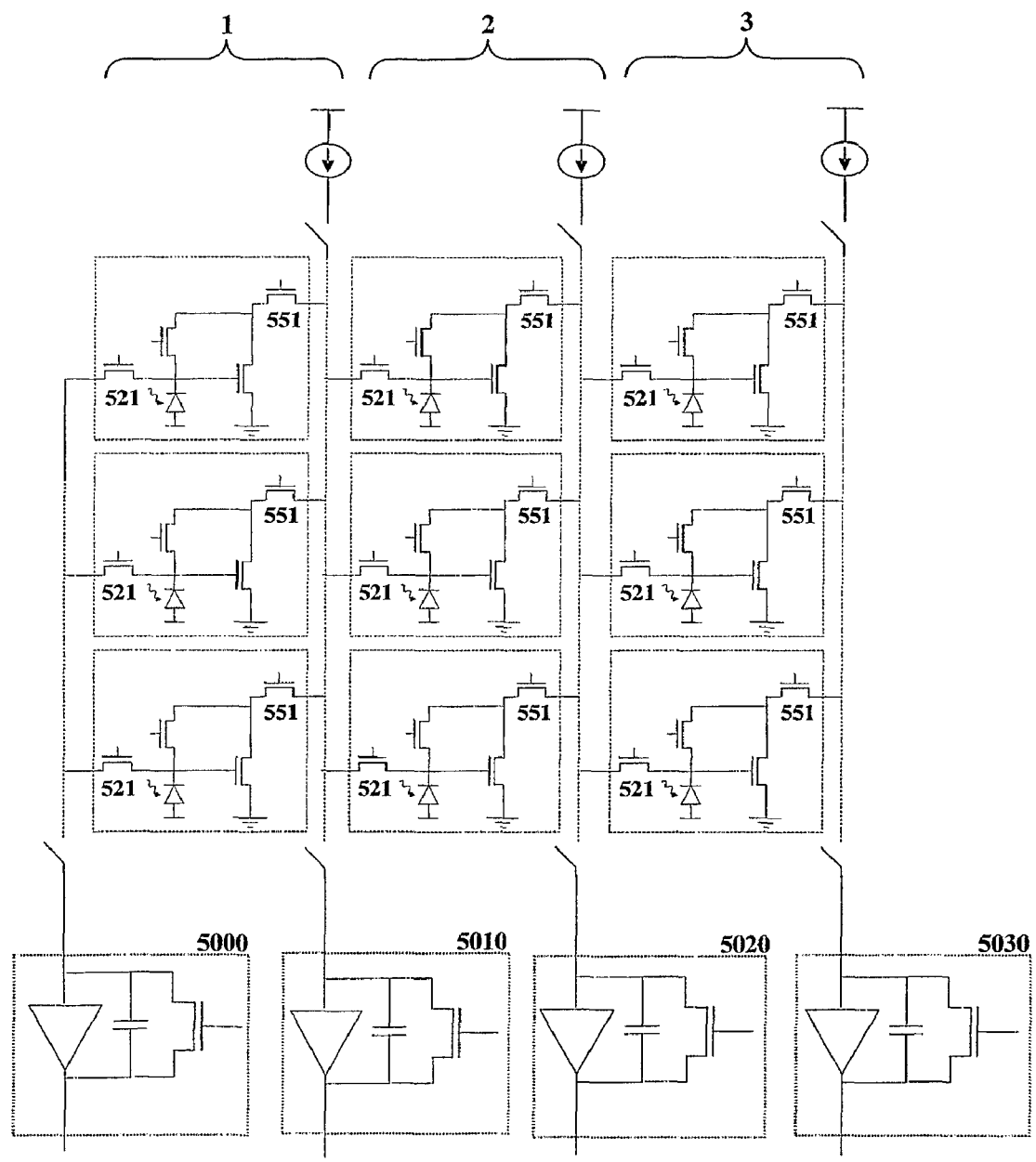
FIG. 5c illustrates the embodiment of FIG. 5a implemented in a 3×3 array according to one embodiment of the present invention.

FIG. 5c illustrates the embodiment of FIG. 5a in a 3×3 active matrix imaging array. The column, or row, readout amplifier circuitry 5010 and 5020 are multiplexed between READ1 transistors 551 and READ2 transistors 521 of adjacent pixels. Readout amplifier circuitry 5000 is connected to READ2 transistors 521 of column 1, and readout amplifier circuitry 5030 is connected to READ transistors 551 of column 3. It would be readily understood that embodiments of the present invention may be implemented in arrays of any size. In addition, common column, or row, circuitry may be multiplexed between adjacent pixels, or by using additional multiplexers. In one embodiment, different values of $I_{BIAS}$ can be used to reset each pixel in the array to account for non-uniform performance of pixels over the imaging array. This non-uniform performance can be a result of fabrication imperfections for example.

Figure 6:
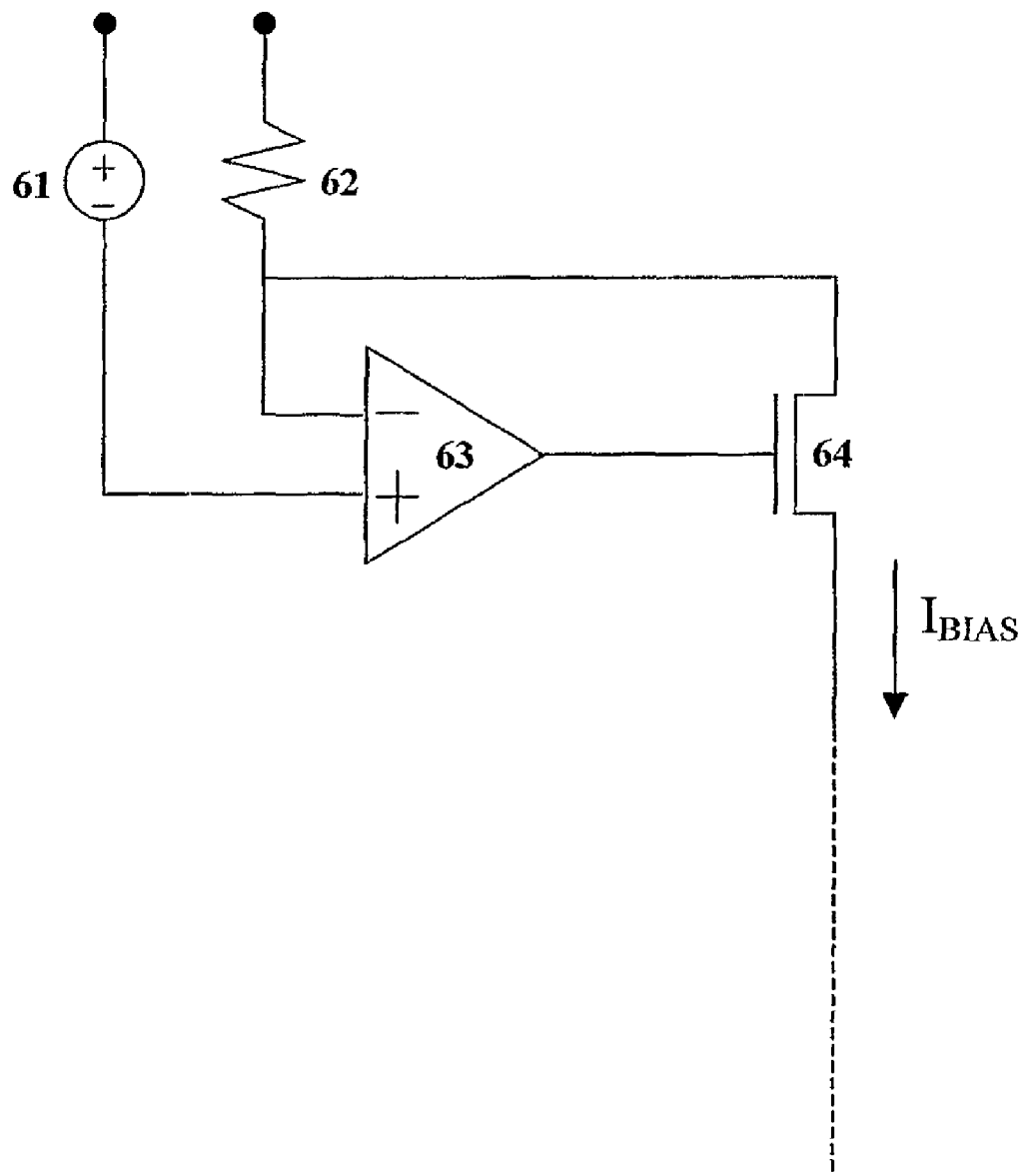
FIG. 6 illustrates a current source implemented using a current conveyor circuit according to one embodiment of the present invention.

Numerous implementations of the current source(s) of the present invention such as current source 49 or current source 59 in FIG. 4a and FIG. 5a, respectively, are possible as would be readily understood by a worker skilled in the art. For example, in one embodiment a current source may be implemented using a current mirror circuit. In another embodiment, a current source may be implemented using a current conveyor circuit as illustrated in FIG. 6. This current conveyor circuit comprises a voltage source 61, a resistor 62, an amplifier 63, and a transistor 64. For a high gain amplifier 63, the current $I_{BIAS}$ produced by this circuit is given by the voltage produced by voltage source 61 divided by the value of resistor 62, and thus, $I_{BIAS}$ can be made independent of the design parameters of transistor 64. Therefore, implementation of this current conveyor circuit has an advantage of being able to use a transistor that may have an inherent metastability. For example, when implementing the present invention using a-Si:H technology, it is desirable to implement transistor 64 using an a-Si:H TFT since this allows integration between the current source and other components of the readout circuitry. Therefore, implementation of a current source for use in an a-Si:H system using the current conveyor circuit of FIG. 6, enables fabrication of transistor 64 in a-Si:H technology without adversely affecting the current output of the circuit, while providing ease of integration of the current source within the system.

Figure 7A:
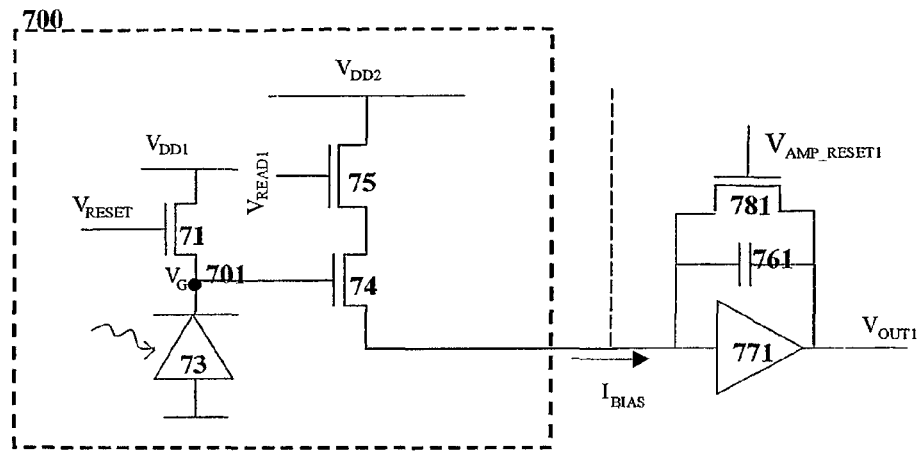
FIG. 7a illustrates an imaging architecture according to one embodiment of the present invention comprising a three transistor pixel implementation.

FIG. 7a illustrates another embodiment of the present invention wherein, RESET transistor 71, READ1 transistor 75, detector 73 and AMP transistor 74 are present within each pixel 700 on the imaging panel. Charge integrator 771, feedback capacitor 761 and AMP_RESET1 transistor 781 form part of the off-pixel readout circuitry. Each of the above components may be off-panel components or on-panel components.

Figure 7B:
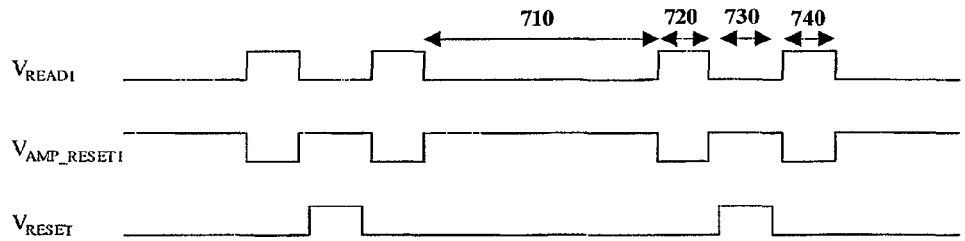

FIG. 7b illustrates an example of a timing diagram for a method of operating this embodiment wherein a double sampling mechanism is used. In this sequence, four cycles are used, namely, an integration cycle 710, a readout cycle 720, a reset cycle 730 and a second readout cycle 740. As would be readily understood by a worker skilled in the art, subsequent signal processing methods can be used to interpret the readout circuitry output signals.

During the integration cycle 710, READ1 transistor 75 is turned OFF and RESET transistor 71 is kept OFF while AMP_RESET1 transistor 781 is turned ON. Photons incident upon detector 73 result in the generation of electron-hole pairs that discharge, or charge, the capacitance $C_{DETECTOR}$ at node 701 and thus reduce, or increase, the voltage at node 701, $V_G$, by an amount $\Delta V_G$. $C_{DETECTOR}$ mainly comprises the detector 73 capacitance and any storage capacitors that may be used.

The readout cycle 720 follows the integration cycle 710 and during this readout cycle, READ1 transistor 75 is turned ON, RESET transistor 71 is kept OFF and AMP_RESET1 transistor 781 is turned OFF, resulting in a current, $I_{bias}+\Delta I_{bias}$, that is proportional to $V_G \pm \Delta V_G$ flowing in the AMP transistor 74 and READ1 transistor 75 branch. The current, $I_{bias} \pm \Delta I_{bias}$ is then integrated by charge amplifier 771 to obtain and store an output voltage, $V_{OUT1}$, on the amplifier feedback capacitor 761.

The reset cycle 730 occurs subsequent to the readout cycle 720 where RESET transistor 71 is pulsed ON and $C_{DETECTOR}$ is charged, or discharged, to reset the voltage at node 701 to $V_G$ while RESET transistor 71 is ON. During this reset cycle, READ1 transistor 75 is turned OFF and AMP_RESET1 transistor 781 is turned ON.

To perform the double sampling operation, the second readout cycle 740 follows the reset cycle 730 where again READ1 transistor 75 is turned ON, RESET transistor 71 is kept OFF and AMP_RESET1 transistor 781 is turned OFF. $I_{bias}$ is integrated by charge amplifier 771 to obtain and store an output voltage, $V_{OUT2}$, on feedback capacitor 761. Subtracting $V_{OUT1}$ from $V_{OUT2}$ yields a $\neq V_{OUT}$ that can be free from non-uniformities and is proportional to $\Delta V_G$.

$\Delta I_{bias}$ is proportional to $\Delta V_G$ and is given as:

$$\Delta I_{bias} = g_m \Delta V_G$$

where $g_m$ is the transconductance of the AMP transistor 74 and READY transistor 75 readout circuit branch.

The circuit produces a charge gain, $G_i$, to amplify the noise vulnerable input signal. The $G_i$ for the circuit is given as:

$$G_i = (g_m T_S)/C_{DETECTOR}$$

where $T_S$ is the amount of time $I_{bias}$ and $\Delta I_{bias}$ are integrated on the feedback capacitor 761. As indicated by the equation above, $G_i$ is programmable via $g_m$, $T_S$ and the choice of an appropriate $C_{DETECTOR}$.

An advantage of this circuit configuration, that is, placing READ1 transistor 75 at the drain side of AMP transistor 74, compared to placing READ1 transistor 75 at the source side of AMP transistor 74, is that with the former configuration READ1 transistor 75 does not act as a degenerate resistor and the circuit therefore provides a larger $g_m$ and subsequently a larger $G_i$.

Figure 7C:
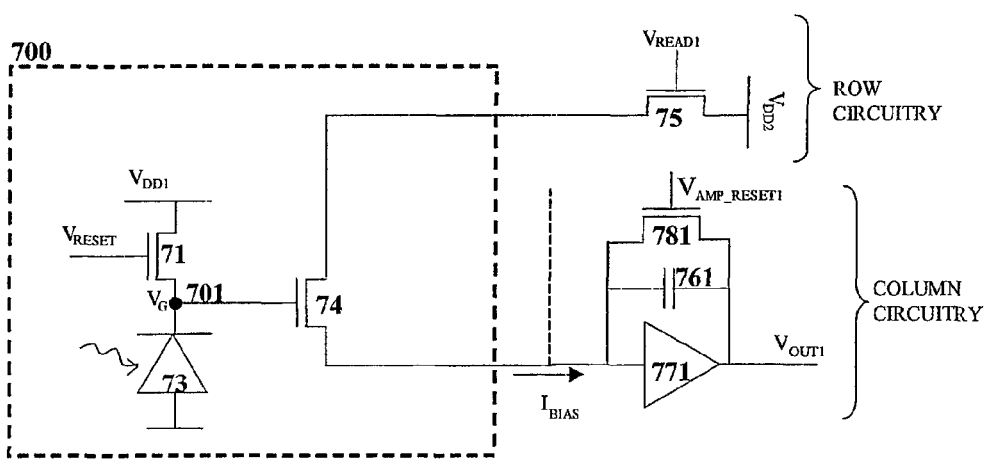
FIG. 7c illustrates the embodiment of FIG. 7a with an on-pixel transistor moved off-pixel.

FIG. 7c illustrates another embodiment of the present invention and is similar to the embodiment of FIG. 7a, except that READ1 transistor 75 has been moved off-pixel.

This architecture thus has the further advantage of enabling a two transistor pixel design which in turn results in a high pixel fill factor to be obtained.

Figure 8A:
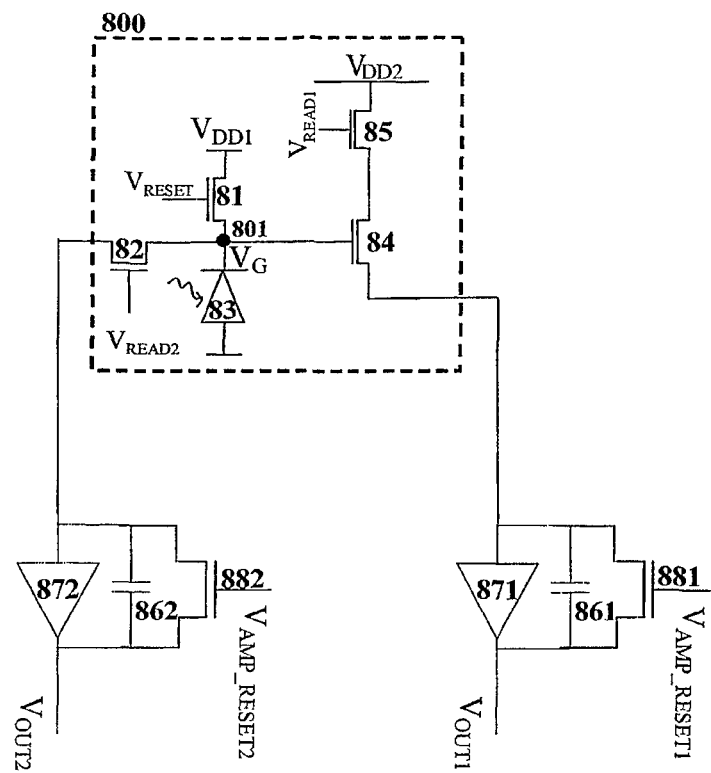
FIG. 8a illustrates an imaging architecture according to another embodiment of the present invention comprising a four transistor, dual mode pixel implementation.

FIG. 8a illustrates an imaging architecture according to one embodiment of the present invention in which the readout circuitry is partially similar to the embodiment of FIG. 7a and can function in two modes. In this embodiment, the readout circuitry can function in an amplification mode when the input signal can be relatively small, for example in applications such as low dose, real-time, x-ray fluoroscopy, and can function in a unity gain mode when the input signal can be relatively large, for example in higher contrast imaging applications like higher energy, real-time, x-ray fluoroscopy or chest radiography. In the embodiment of FIG. 8a, RESET transistor 81, READ2 transistor 82, detector 83, AMP transistor 84, and READ1 transistor 85 are present within each pixel 800 on the imaging panel. Charge integrator 871, charge integrator 872, feedback capacitor 861, feedback capacitor 862, AMP_RESET1 transistor 881, and AMP_RESET2 transistor 882 form part of the readout circuitry and are used to read out signals from the pixel, and may be off-panel components or on-panel components.

The input signal from detector 83 can be read out using either the amplification or unity gain mode, or both of these modes. Both the amplification mode and the unity gain mode can be used to readout the same input signal since during the amplification mode the signal readout is essentially 'non-destructive' to the input signal, and therefore the input signal can remain available for subsequent readout in the unity gain mode. Due to the 'destructive' nature of the readout during the unity gain mode, this mode of readout is typically performed subsequent to the amplification mode readout. To operate the sensor solely in the amplification mode for small, noise vulnerable, input signal acquisition, READ2 transistor 82 is kept OFF. In this mode, the readout circuitry can function in a reset, integration and readout cycle. To operate the sensor solely in the unity gain mode, READ1 transistor 85 and RESET transistor 81 are kept OFF and the readout circuitry can function in a reset/readout cycle and an integration cycle.

Figure 8B:
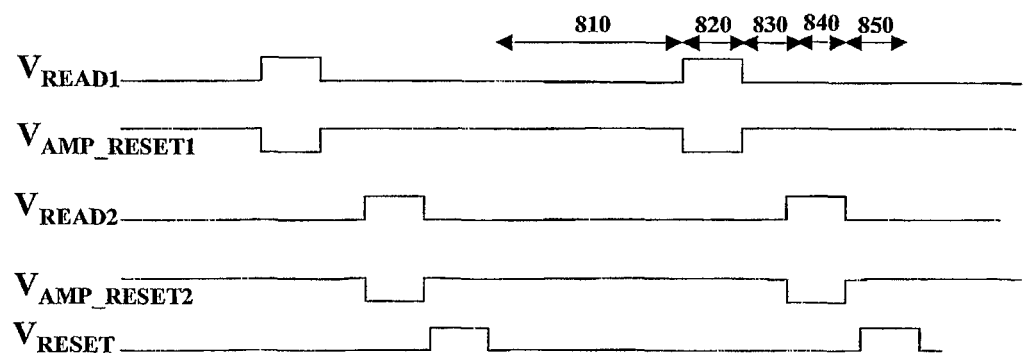

FIG. 8b illustrates an example of a timing diagram for a sequence in which each input signal from detector 83 is read out in the amplification mode followed by the unity gain mode. In this sequence, five cycles are used, namely, an integration cycle 810, an amplification mode readout cycle 820, a charge amplifier reset cycle 830, a unity gain mode readout cycle 840 and a reset cycle 850. As would be readily understood by a worker skilled in the art, subsequent signal processing methods can be used to interpret the readout circuitry output signals. For example, where the input signal is outside the dynamic range of a particular mode, this would be appropriately interpreted by the signal processing means.

During the integration cycle 810, READ2 transistor 82, READ1 transistor 85 and RESET transistor 81 are kept OFF while AMP_RESET1 transistor 881 and AMP_RESET2 transistor 882 are kept ON. Photons incident upon detector 83 result in the generation of electron-hole pairs that discharge, or charge, the capacitance $C_{DETECTOR}$ of detector 83 and thus reduce, or increase, the voltage at node 801, $V_G$, by an amount $\Delta V_G$. $C_{DETECTOR}$ is the capacitance at node 801 and mainly comprises the detector capacitance and any storage capacitors that may be used, as would be readily understood by a worker skilled in the art.

The amplification mode readout cycle 820 follows the integration cycle 810 and during this amplification mode readout cycle, READ1 transistor 85 is turned ON, RESET transistor 81 is kept OFF, READ2 transistor 82 is kept OFF, AMP_RESET2 transistor 882 is kept ON and the AMP_RESET1 transistor 881 is turned OFF. Thus, a current, $I_{BIAS} \pm \Delta I_{BIAS}$, that is proportional to $V_G \pm \Delta V_G$ flows in the AMP transistor 84 and READ1 transistor 85 branch. The current, $I_{BIAS} \pm \Delta I_{BIAS}$ is then integrated by charge amplifier 871 to obtain and store an output voltage, $V_{OUT1}$ on the amplifier feedback capacitor 861. $V_{OUT1}$ represents the amplified input signal that can be subsequently recorded and manipulated by signal processors, as would be readily understood by a worker skilled in the art.

The charge amplifier reset cycle 830 follows the amplification mode readout cycle 820 where, during the charge amplifier reset cycle READ1 transistor 85 is turned OFF, RESET transistor 81 is kept OFF, READ2 transistor 82 is kept OFF, AMP_RESET2 transistor 882 is kept ON and the AMP_RESET1 transistor 881 is turned ON. Thus, the output for charge amplifier 871 is reset. The charge amplifier reset cycle may only be needed when there is an adjacent pixel that has multiplexed its READ2 transistor output with the READ1 transistor 85 output of the current pixel 800 as would be readily understood by a worker skilled in the art.

The unity gain mode readout cycle 840 follows the charge amplifier reset cycle 830 and during this unity gain mode readout cycle, READ2 transistor 82 is turned ON, RESET transistor 81 is kept OFF, READ1 transistor 85 is kept OFF, AMP_RESET1 transistor 881 is kept ON and AMP_RESET2 transistor 882 is turned OFF. Here, the voltage $V_G$ at node 801 is transferred and stored on the feedback capacitor 862 and appears as an output voltage $V_{OUT2}$. $V_{OUT2}$ represents the input signal with a unity gain that can be recorded by subsequent signal processors, as would be readily understood by a worker skilled in the art. In a further embodiment, some gain may be applied to the input signal in the unity gain mode by using appropriate values for feedback capacitor 862.

The reset cycle 850 occurs subsequent to the unity gain mode readout cycle 840 where in this reset cycle RESET transistor 81 is pulsed ON and $C_{DETECTOR}$ is charged or discharged to reset the voltage at node 801 to $V_G$ while RESET transistor 81 is ON. During this reset cycle, READ2 transistor 82 is turned OFF, READ1 transistor 85 is kept OFF, AMP_RESET2 transistor 882 is turned ON and AMP_RESET1 transistor 881 is kept ON.

The pixel output in the embodiment of FIG. 8a can be linear for relatively small and large input signals, therefore the effect of non-uniformities in the imager fabrication process, transistor metastability, and external circuit non-uniformity can be mitigated by the use of standard double sampling and offset-and-gain correction techniques commonly applied in imaging as would be readily understood.

Figure 8C:
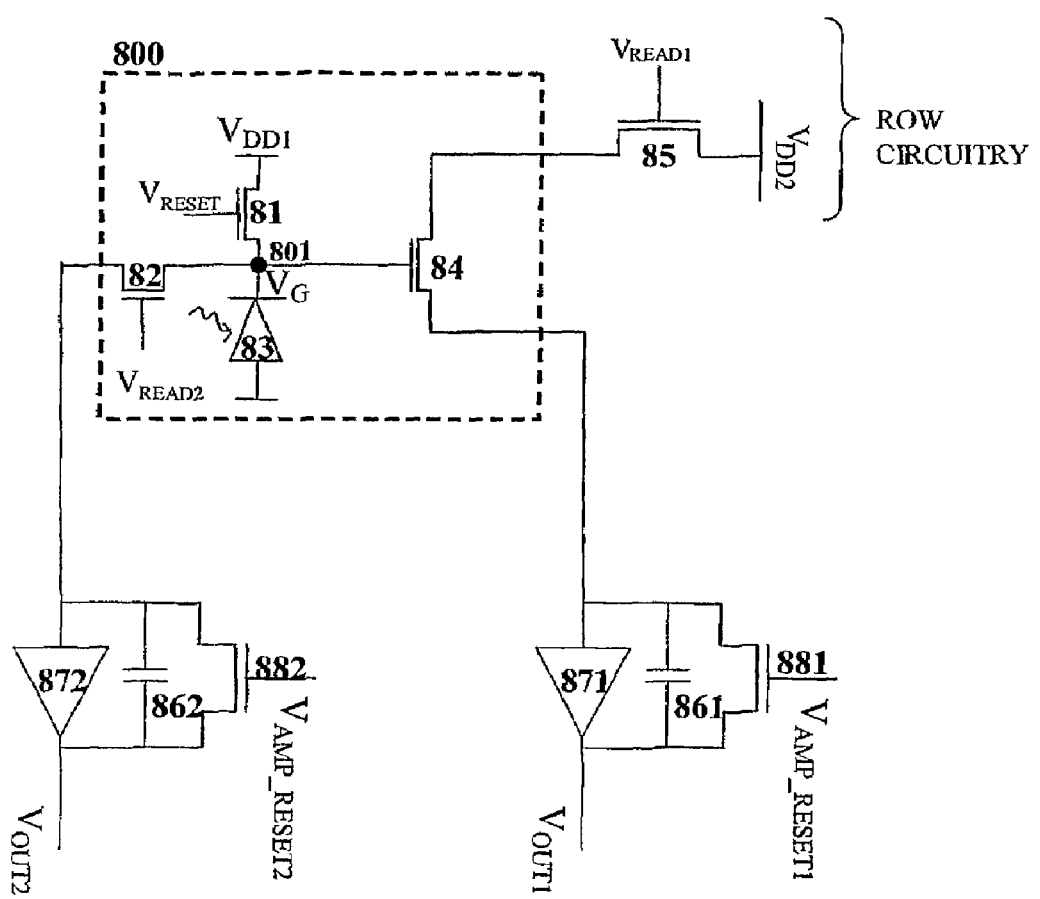
FIG. 8c illustrates the embodiment of FIG. 8a with an on-pixel transistor moved off-pixel.

FIG. 8c illustrates another embodiment of the present invention and is similar to the embodiment of FIG. 8a, except that READ1 transistor 85 has been moved off-pixel. Again, this architecture thus has the advantage of enabling a three transistor pixel design which in turn allows a high pixel fill factor to be obtained.

Figure 9A:
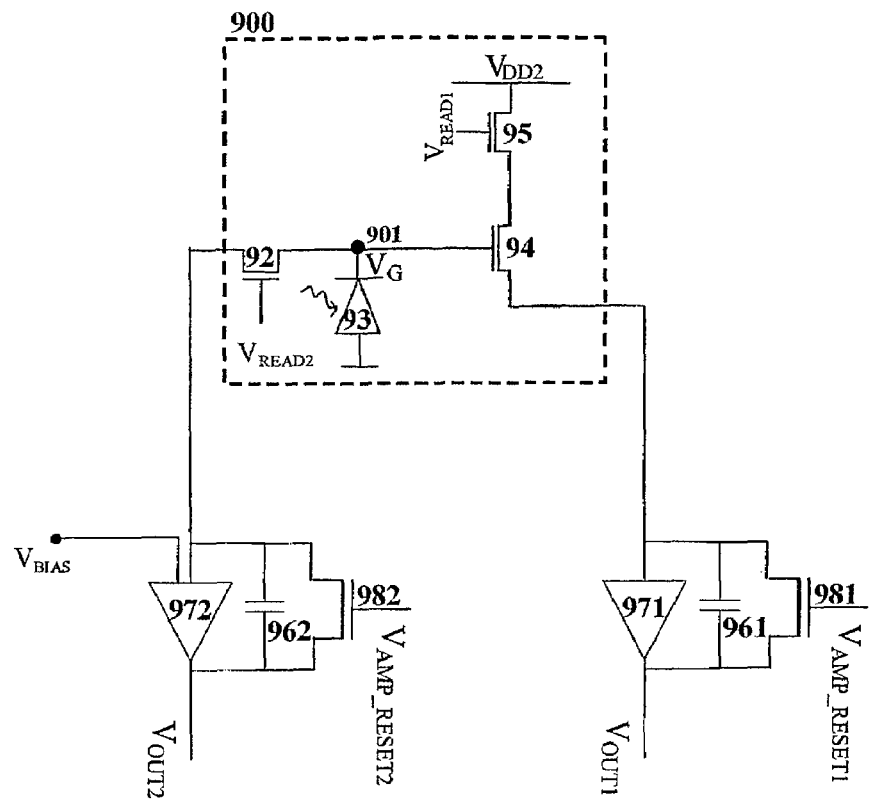
FIG. 9a illustrates an imaging architecture according to one embodiment of the present invention comprising a three transistor, dual mode pixel implementation.

FIG. 9a illustrates an imaging architecture according to another embodiment of the present invention in which the readout circuitry is partially similar to the embodiment of FIG. 7a and can function in two modes. This embodiment is similar to the embodiment of FIG. 8a, with the removal of RESET transistor 81 since the functionality of RESET transistor 81 is multiplexed with READ2 transistor 82 using a single READ2 transistor 92. This architecture can provide the advantage of a smaller pixel size, less parasitic capacitance and faster readout times.

The readout circuitry can similarly function in an amplification mode when the input signal can be relatively small and can similarly function in a unity gain mode when the input signal can be relatively large.

In the embodiment of FIG. 9a, READ2 transistor 92, detector 93, AMP transistor 94, and READ1 transistor 95 are present within each pixel 900 on the imaging panel. Charge integrator 971, charge integrator 972, feedback capacitor 961, feedback capacitor 962, AMP_RESET1 transistor 981, and AMP_RESET2 transistor 982 form part of the readout circuitry and are used to read out signals from the pixel, and may be off-panel components or on-panel components.

The input signal from detector 93 can be read out using either the amplification or unity gain mode, or both of these modes. Again, both the amplification mode and the unity gain mode can be used to read out the same input signal since during the amplification mode the signal readout is 'non-destructive' to the input signal. Similarly, due to the substantially 'destructive' nature of the readout during the unity gain mode, the unity gain mode readout is typically performed subsequent to the amplification mode readout.

Figure 9B:
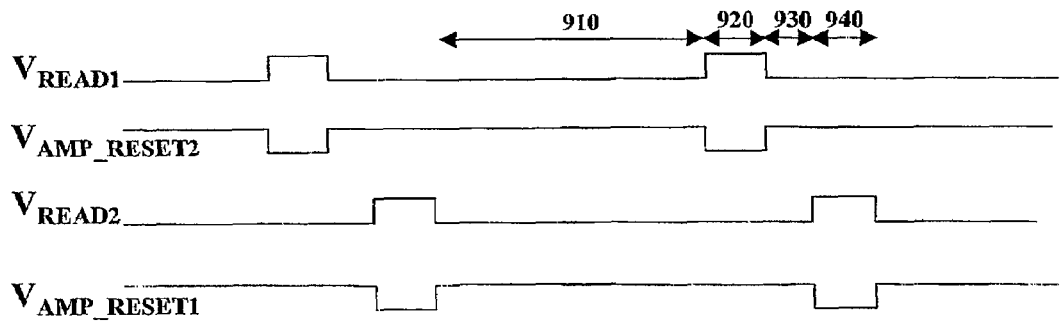

FIG. 9b illustrates an example of a timing diagram for a sequence in which each input signal from detector 93 is read out in the amplification mode followed by the unity gain mode. Here, four cycles are used in the sequence, namely, an integration cycle 910, an amplification mode readout cycle 920, a charge amplifier reset cycle 930, and a unity gain readout cycle 940.

During the integration cycle 910, READ2 transistor 92 and READ1 transistor 95 are kept OFF while AMP_RESET2 transistor 982 and AMP_RESET1 transistor 981 are kept ON. Photons incident upon detector 93 result in the generation of electron-hole pairs that discharge, or charge, the capacitance $C_{DETECTOR}$ of detector 93 and thus reduce, or increase, $V_G$ by an amount $\Delta VG$. $C_{DETECTOR}$ is the capacitance at node 901 and mainly comprises the detector capacitance and any storage capacitors that may be used, as would be readily understood by a worker skilled in the art.

The amplification mode readout cycle 920 follows the integration cycle 910 and during this amplification mode readout cycle, READ1 transistor 95 is turned ON, READ2 transistor 92 is kept OFF, AMP_RESET2 transistor 982 is kept ON and the AMP_RESET1 transistor 981 is turned OFF. Thus, a current, $I_{BIAS} \pm \Delta I_{BIAS}$, that is proportional to $V_G \pm \Delta V_G$ flows in the AMP transistor 94 and READ1 transistor 95 branch. The current, $I_{BIAS} \pm \Delta I_{BIAS}$ is then integrated by charge amplifier 971 to obtain and store an output voltage, $V_{OUT1}$ on the amplifier feedback capacitor 961. $V_{OUT1}$ represents the amplified input signal that can be subsequently recorded and manipulated by signal processors, as would be readily understood by a worker skilled in the art.

The charge amplifier reset cycle 930 follows the amplification mode readout cycle 920 where, during the charge amplifier reset cycle READ1 transistor 95 is turned OFF, RESET transistor 91 is kept OFF, READ2 transistor 92 is kept OFF, AMP_RESET2 transistor 982 is kept ON and the AMP_RESET1 transistor 981 is turned ON. Thus, the output for charge amplifier 971 is reset. The charge amplifier reset cycle 930 may only be needed when there is an adjacent pixel that has multiplexed its READ2 transistor output with the READ1 transistor 95 output of the current pixel 900 as would be readily understood by a worker skilled in the art.

The unity gain mode readout cycle 940 follows the charge amplifier reset cycle 930 and during this unity gain mode readout cycle, READ2 transistor 92 is turned ON, READ1 transistor 95 is kept OFF, AMP_RESET1 transistor 981 is kept ON and AMP_RESET2 transistor 982 is turned OFF. READ2 transistor 92 is multiplexed to both read out the input signal and reset the voltage $V_G$ at the pixel node 901 by setting $V_{BIAS}$ to an appropriate reset voltage such as $V_{DD}$ during the unity gain mode readout cycle 940. During all other cycles, $V_{BIAS}$ may be set to a voltage such as ground. During the unity gain mode readout cycle 940, the voltage $V_G$ at node 901 is transferred and stored on the feedback capacitor 962 and appears as an output voltage $V_{OUT2}$. $V_{OUT2}$ represents the input signal with a unity gain that may be subsequently recorded and manipulated by signal processors, as would be readily understood by a worker skilled in the art. In a further embodiment, some gain may be applied to the input signal in the unity gain mode by using appropriate values for feedback capacitor 962. Subsequent signal processing methods can be used to interpret the readout circuitry output signals.

The pixel output in this embodiment can also be linear for relatively small and large input signals, therefore the effect of non-uniformities in the imager fabrication process, transistor metastability, and external circuit non-uniformity can be mitigated by standard double sampling and offset-and-gain correction techniques commonly applied in imaging as would be readily understood.

Figure 9C:
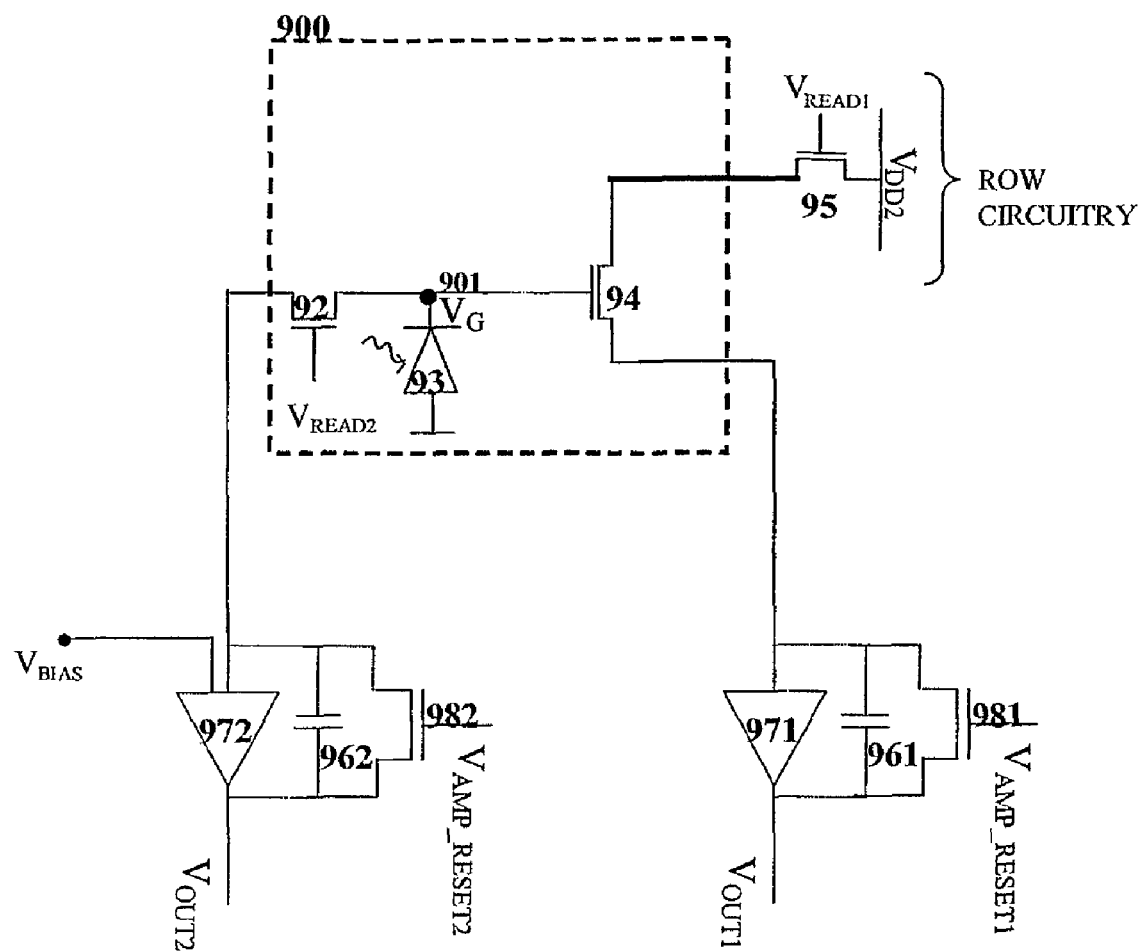
FIG. 9c illustrates the embodiment of FIG. 9a with an on-pixel transistor moved off-pixel.

FIG. 9c illustrates another embodiment of the present invention and is similar to the embodiment of FIG. 9a, except that READ1 transistor 95 has been moved off-pixel. This architecture thus has the advantage of enabling a two transistor pixel design which in turn allows a high pixel fill factor to be obtained.

FIG. 10 illustrates another embodiment of the present invention wherein, RESET transistor 101, READ1 transistor 105, detector 103 and AMP transistor 104 are present within each pixel 1000 on the imaging panel as shown. Charge integrator 1071, feedback capacitor 1061 and AMP_RESET1 transistor 1081 form part of the off-pixel readout circuitry. Each of the above components may be off-panel components or on-panel components.

Figure 10A:
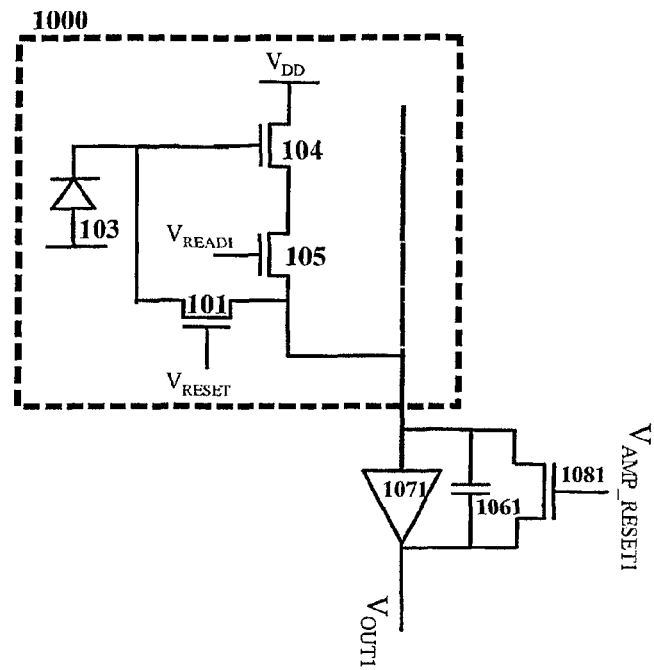
FIG. 10a illustrates an imaging architecture according to another embodiment of the present invention comprising a three transistor pixel implementation.
Figure 10B:
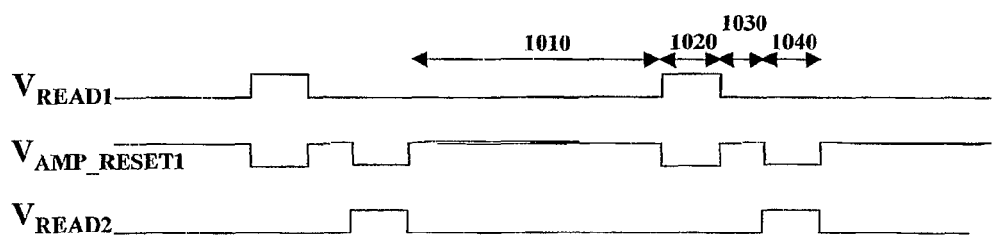
Figure 11A:
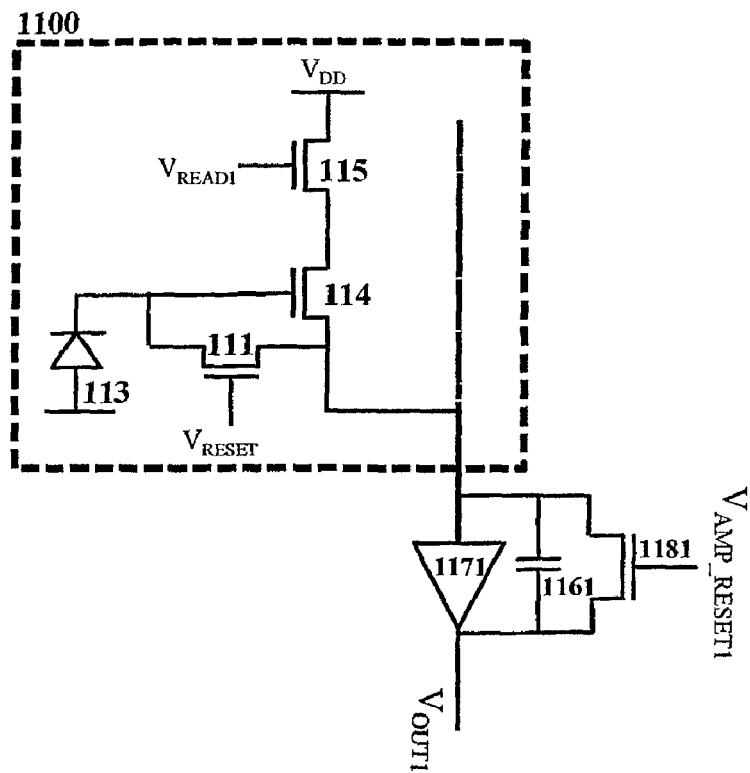
FIG. 11a illustrates an imaging architecture according to another embodiment of the present invention comprising a three transistor pixel implementation.

FIG. 11a illustrates another embodiment of the present invention wherein, RESET transistor 111, READ1 transistor 115, detector 113 and AMP transistor 114 are present within each pixel 1100 on the imaging panel as shown. Charge integrator 1171, feedback capacitor 1161 and AMP_RESET1 transistor 1181 form part of the off-pixel readout circuitry. Each of the above components may be off-panel components or on-panel components. An advantage of the embodiment of FIG. 11a over the embodiment of FIG. 10 is that in the former architecture, the READ1 transistor 114 is on the drain side of the AMP transistor 115 and thus does not act as a degenerate resistor as in the case of READ1 transistor 105. The embodiment of FIG. 11a can thus provide a larger gain than that of FIG. 10.

Figure 11B:
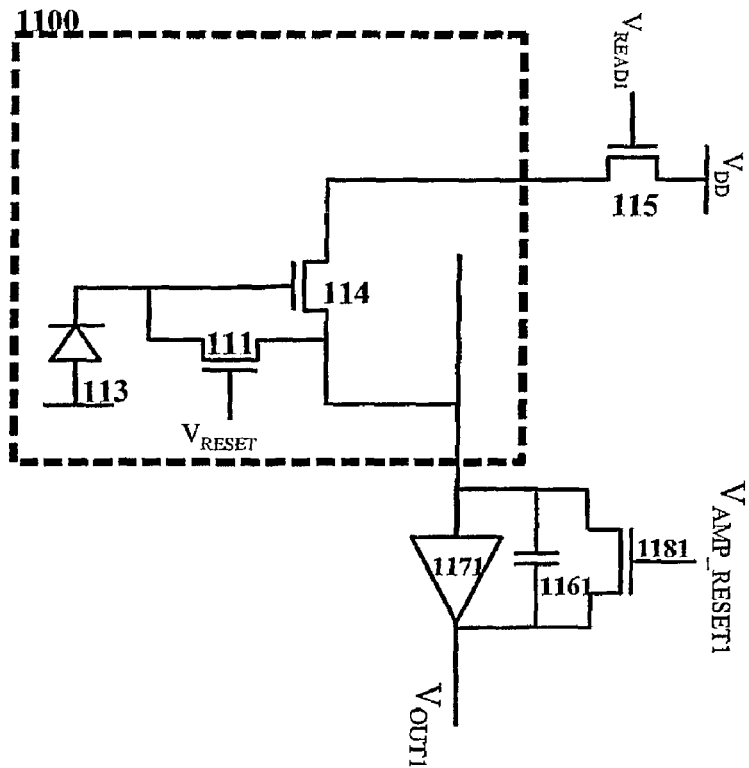
FIG. 11b illustrates the embodiment of FIG. 11a with an on-pixel transistor moved off-pixel.

FIG. 11b illustrates an embodiment of the present invention similar to that of FIG. 11a except that READ1 transistor 114 has been moved off-pixel. This has the advantage of enabling a two transistor pixel which allows a larger fill factor to be obtained.

The pixel architectures of each of FIG. 10, FIG. 11a and FIG. 11b can function in two modes, namely a unity gain mode and an amplification mode, without any additional transistors or changes in architecture. This is because RESET transistor 101 and RESET transistor 111 can also function as read transistors during the unity gain mode of operation, that is, these transistors can be turned ON to directly output the signal from detector 103 and detector 104, respectively, during the unity gain mode. One advantage of these architectures is that a data line can be eliminated when utilized as a dual mode system compared to other architectures where an additional data line is required for output of the signal during the unity gain mode of operation. FIG. 10b illustrates an example of a timing diagram that can be used for operation of the embodiment of FIG. 10a, FIG. 11a and FIG. 11b.

Figure 12A:
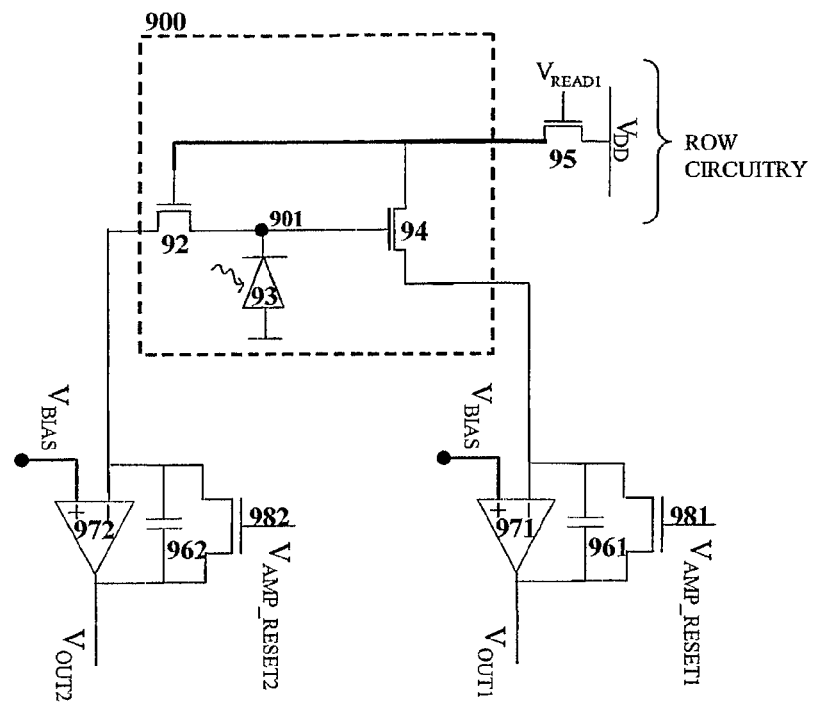
FIG. 12a illustrates an imaging architecture according to one embodiment of the present invention in which one transistor's gate line is multiplexed with another transistor's drain line.

In the embodiments of the present invention, various component bias lines may be multiplexed in order to reduce the number of external pixel connections. For example, the embodiment of FIG. 12a shows the embodiment of FIG. 9c with the drain of AMP transistor 94 connected to the gate of READ2 transistor 92. The operating signals and sequences determine when each of these transistors is switched ON.

Figure 12B:
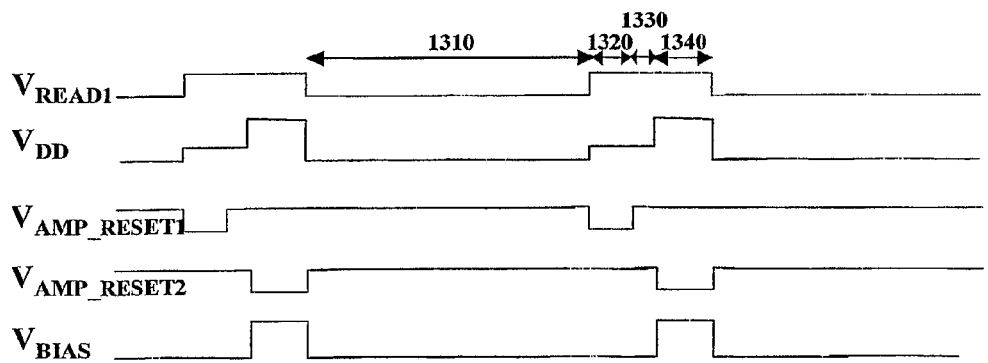

FIG. 12b illustrates an example of a timing diagram for operation of the embodiment of FIG. 12a. Each input signal from detector 93 is read out in the amplification mode followed by the unity gain mode. Here, four cycles are used in the sequence, namely, an integration cycle 1310, an amplification mode readout cycle 1320, a charge amplifier reset cycle 1330, and a unity gain mode readout cycle 1340.

During the integration cycle 1310, READ2 transistor 92 and READ1 transistor 95 are kept OFF while AMP_RESET1 transistor 982 and AMP_RESET2 transistor 981 are kept ON. Photons incident upon detector 93 result in the generation of electron-hole pairs that discharge, or charge, the capacitance $C_{DETECTOR}$ of detector 93 and thus reduce, or increase, $V_G$ by an amount $\Delta V_G$. $C_{DETECTOR}$ is the capacitance at node 901 and comprises the detector capacitance and any storage capacitors that may be used.

The amplification mode readout cycle 1320 follows the integration cycle 1310 and during this amplification mode readout cycle, the READ1 transistor 95 is turned ON and the READ2 transistor 92 is kept OFF or nearly OFF by using an appropriate bias level for $V_{DD}$. The AMP_RESET2 transistor 982 is kept ON and the AMP_RESET1 transistor 981 is turned OFF. Thus, a current, $I_{BIAS} \pm \Delta I_{BIAS}$, that is proportional to $V_G \pm \Delta V_G$ flows in the AMP transistor 94 branch. The current, $I_{BIAS} \pm \Delta I_{BIAS}$ is then integrated by charge amplifier 971 to obtain and store an output voltage, $V_{OUT1}$ on the amplifier feedback capacitor 961. $V_{OUT1}$ represents the amplified input signal that can be subsequently recorded and manipulated by signal processors, as would be readily understood by a worker skilled in the art.

The charge amplifier reset cycle 1330 follows the amplification mode readout cycle 1320 where, during the charge amplifier reset cycle READ1 transistor 95 is kept ON and READ2 92 transistor is kept OFF, AMP_RESET2 transistor 982 is kept ON and AMP RESET1 transistor 981 is turned ON. Thus, the output for charge amplifier 971 is reset. The charge amplifier reset cycle 1330 may only be needed when there is an adjacent pixel that has multiplexed its output with the output of the current pixel 900 as would be readily understood by a worker skilled in the art.

The unity gain mode readout cycle 1340 follows the charge amplifier reset cycle 1330 and during this unity gain mode readout cycle, READ2 transistor 92 is turned ON by an appropriate bias level for $V_{DD}$, READ1 transistor 95 is kept ON, AMP_RESET1 transistor 981 is kept ON and AMP_RESET2 transistor 982 is turned OFF. READ2 transistor 92 is multiplexed to both read out the input signal and reset the voltage $V_G$ at the pixel node 901 by setting $V_{BIAS}$ to an appropriate reset voltage such as $V_{DD}$ during the unity gain mode readout cycle 1340. During all other cycles, $V_{BIAS}$ may be set to a voltage such as ground. During the unity gain mode readout cycle 1340, the voltage $V_G$ at node 901 is transferred and stored on the feedback capacitor 962 and appears as an output voltage $V_{OUT2}$. $V_{OUT2}$ represents the input signal with a unity gain that may be subsequently recorded and manipulated by signal processors, as would be readily understood by a worker skilled in the art. In a further embodiment, some gain may be applied to the input signal in the unity gain mode by using appropriate values for feedback capacitor 962. Subsequent signal processing methods can be used to interpret the readout circuitry output signals.

The pixel output in this embodiment can also be linear for relatively small and large input signals, therefore the effect of non-uniformities in the imager fabrication process, transistor metastability, and external circuit non-uniformity can be mitigated by standard double sampling and offset-and-gain correction techniques commonly applied in imaging as would be readily understood.

Figure 12C:
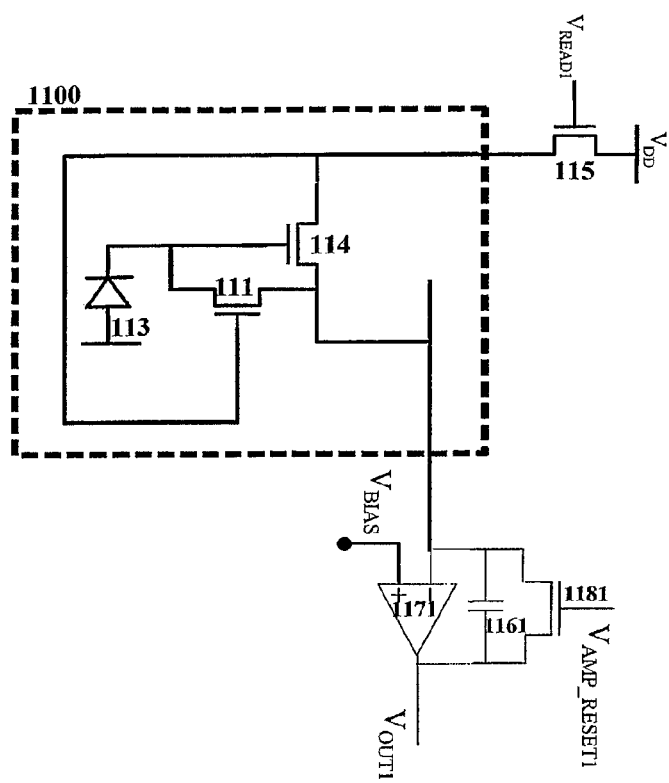
FIG. 12c illustrates an imaging architecture according to another embodiment of the present invention in which one transistor's gate line is multiplexed with another transistor's drain line.
Figure 12D:
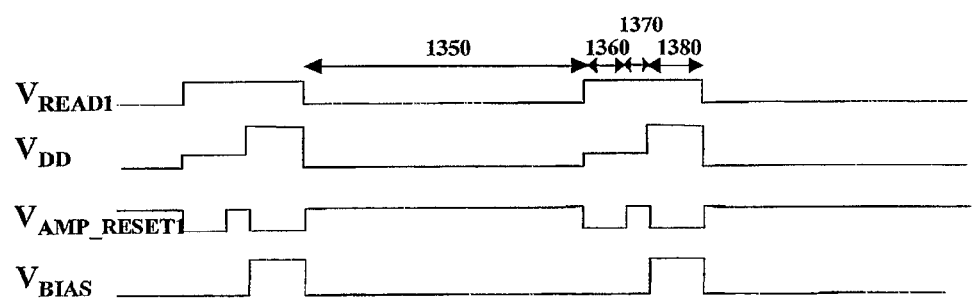
FIG. 12d illustrates an example of a timing diagram for the embodiment of FIG. 12c.

Similarly, the embodiment of FIG. 12c shows the embodiment of FIG. 1c with the drain of AMP transistor 114 connected to the gate of RESET transistor 111. The operating signals and sequences determine when each of these transistors is switched ON. FIG. 12d illustrates an example of a timing diagram for operation of the embodiment of FIG. 12c.

FIG. 12d illustrates an example of a timing diagram for a sequence in which each input signal from detector 113 is read out in the amplification mode followed by the unity gain mode. Here, four cycles are used in the sequence, namely, an integration cycle 1350, an amplification mode readout cycle 1360, a charge amplifier reset cycle 1370, and a unity gain mode readout cycle 1380.

During the integration cycle 1350, RESET transistor 111 and READ1 transistor 115 are kept OFF while AMP_RESET1 transistor 1182 is kept ON. Photons incident upon detector 113 result in the generation of electron-hole pairs that discharge, or charge, the capacitance $C_{DETECTOR}$ of detector 113 and thus reduce, or increase, $V_G$ by an amount $\Delta V_G$. $C_{DETECTOR}$ is the capacitance at node 1101 and comprises the detector capacitance and any storage capacitors that may be used.

The amplification mode readout cycle 1360 follows the integration cycle 1350 and during this amplification mode readout cycle, the READ1 transistor 115 is turned ON and the RESET transistor 111 is kept OFF or nearly OFF by using an appropriate bias level for $V_{DD}$. The AMP_RESET1 transistor 1182 is turned OFF. Thus, a current, $I_{BIAS} \pm \Delta I_{BIAS}$, that is proportional to $V_G \pm \Delta V_G$ flows in the AMP transistor 114 branch. The current, $I_{BIAS} \pm \Delta I_{BIAS}$ is then integrated by charge amplifier 1171 to obtain and store an output voltage, $V_{OUT1}$ on the amplifier feedback capacitor 1161. $V_{OUT1}$ represents the amplified input signal that can be subsequently recorded and manipulated by signal processors, as would be readily understood by a worker skilled in the art.

The charge amplifier reset cycle 1370 follows the amplification mode readout cycle 1360 where, during the charge amplifier reset cycle READ1 transistor 115 is kept ON and the RESET transistor 111 is kept OFF, and the AMP_RESET1 transistor 1181 is turned ON. Thus, the output for charge amplifier 1171 is reset.

The unity gain mode readout cycle 1380 follows the charge amplifier reset cycle 1370 and during this unity gain mode readout cycle, RESET transistor 111 is turned ON by an appropriate bias level for $V_{DD}$, READ1 transistor 115 is kept ON, AMP_RESET1 transistor 1181 is kept ON and AMP_RESET2 transistor 1182 is turned OFF. RESET transistor 111 is multiplexed to both read out the input signal and reset the voltage $V_G$ at the pixel node 1101 by setting $V_{BIAS}$ to an appropriate reset voltage such as $V_{DD}$ during the unity gain mode readout cycle 1380. During all other cycles, $V_{BIAS}$ may be set to a voltage such as ground. During the unity gain mode readout cycle 1380, the voltage $V_G$ at node 1101 is transferred and stored on the feedback capacitor 1162 and appears as an output voltage $V_{OUT2}$. $V_{OUT2}$ represents the input signal with a unity gain that may be subsequently recorded and manipulated by signal processors, as would be readily understood by a worker skilled in the art. In a further embodiment, some gain may be applied to the input signal in the unity gain mode by using appropriate values for feedback capacitor 1162. Subsequent signal processing methods can be used to interpret the readout circuitry output signals.

The pixel output in this embodiment can also be linear for relatively small and large input signals, therefore the effect of non-uniformities in the imager fabrication process, transistor metastability, and external circuit non-uniformity can be mitigated by standard double sampling and offset-and-gain correction techniques commonly applied in imaging as would be readily understood.

In various embodiments of the present invention, multiple feedback capacitors can be associated with the off-panel charge amplifiers in the readout circuitry. These capacitors can have various capacitance values and be arranged in series and/or parallel configurations and designed to be switch selectable to provide different required gains. Other methods of varying gain are also possible as would be readily understood by a worker skilled in the art. In addition, off-panel transimpedance amplifiers may also be used in place of the charge amplifiers. In this case, multiple feedback resistors may be associated with the transimpedance amplifier and may have various resistance values and be arranged in series and/or parallel configurations and designed to be switch selectable to provide different required gains.

From the embodiments presented thus far, it can be seen that a key element of the present invention is the use of an on-pixel transistor for amplification of the input signal from the detector. This amplification transistor is denoted by the various AMP transistors in the embodiments above. The amplification transistor can be n-type or p-type and additional components such as other transistors, resistors, inductors and capacitors, may also be used in addition to the amplification transistor to obtain amplification. In order to capture the amplified signal provided by the amplification transistor a number of other transistors are required to facilitate the resetting and reading out of the signal, namely the RESET and READ transistors described in the embodiments above. The reset transistors essentially revert the input signal back to a predetermined background level prior to receiving a subsequent input signal. The read transistors essentially allow the amplified signal to be switched to external electronics for further processing. The specific positions of the various read and reset transistor may result in varying advantages and disadvantage of the circuit as would be readily understood by a worker skilled in the art. In some cases the read and reset transistors may also be multiplexed, that is, a single transistor may be used to function as both a read and a reset transistor. Additional components such as power supplies, capacitors, inductors and resistors may also be included in the circuit to enable the reset and readout of the amplified signal. The read and reset transistors as well as any other components that may form part of the readout circuitry may be physically located on-pixel or off-pixel.

Figure 13:
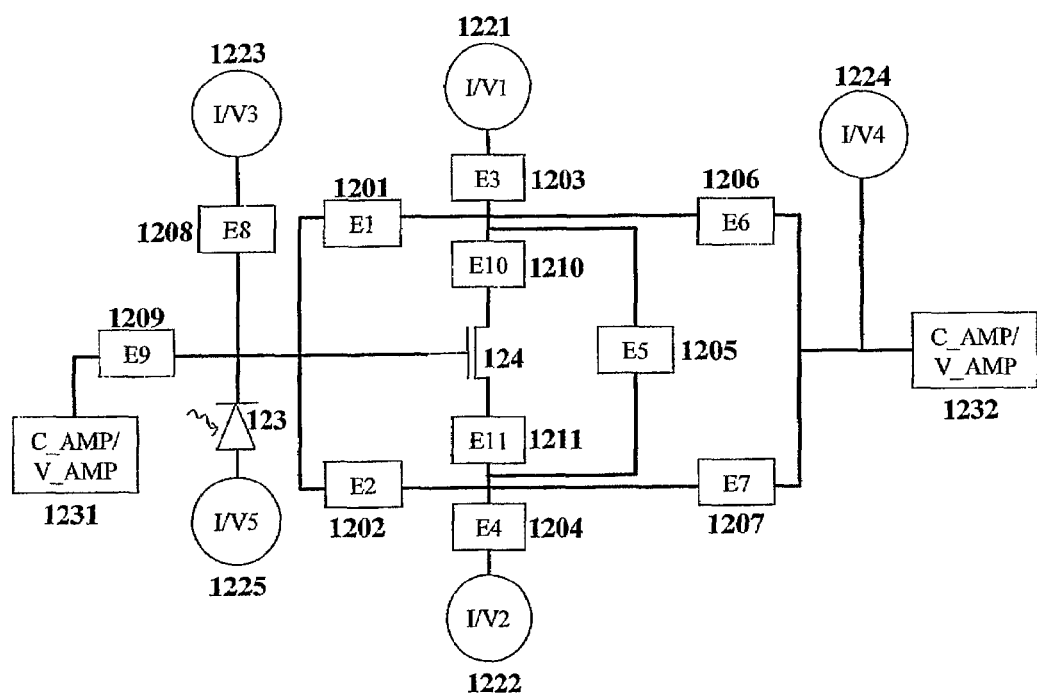
FIG. 13 illustrates generalized imaging architecture embodiments according to the present invention.

The various embodiments presented thus far can therefore be generalized as shown in FIG. 13. AMP transistor 124 is the transistor used for amplification of the input signal received from detector 123. Elements E1 to E11, 1201 to 1211, respectively, indicate positions that can be occupied by electrical components such as transistors, capacitors, inductors and/or resistors, or may be an open or short circuit. These elements can be used to reset the input signal to a predetermined level and/or transfer the amplified signal to external electronics. Power sources I/V1 to I/V5, 1221 to 1225, respectively can be used to supply power to the various parts of the circuit and may be fixed or programmable sources, current or voltage sources, or simply an open or short circuit. The gates of transistors used within the circuit may be multiplexed with any of power sources 1221 to 1225, or may be powered independently. C_AMP/V_AMP1 1231 and C_AMP/V_AMP2 1232, may be current or voltage amplifiers. C_AMP/V_AMP1 1231 may or may not be used depending on whether the system is used as a single-mode or multi-mode configuration as described above. For example, in a single mode configuration the system may be used solely to provide unity gain or solely to provide amplification of the input signal, whereas in a dual mode configuration, the system may be used to provide either unity gain or amplification or both to the input signal depending on the magnitude of the input signal. In some circumstances the system may also function in a tri-mode configuration. It would be readily understood by a worker skilled in the art that the generalization shown in FIG. 13 can be expanded to incorporate additional modes of operation.

Pre-amplification

In another embodiment of the present invention, the readout circuitry is capable of providing large amplification and thus additional noise immunity to the input signal from the detector by implementing a second amplification stage within the readout circuitry. In this embodiment the voltage change produced across the detector provides the input signal to the first stage, or pre-amplification stage. The output signal from the pre-amplification stage then forms the input signal to the second amplification stage, or amplification transistor, which subsequently provides an output signal with a larger gain than would have been obtained with the amplification transistor independently. Additional amplification stages may also be implemented however, this may increase the complexity of the circuitry.

Figure 14:
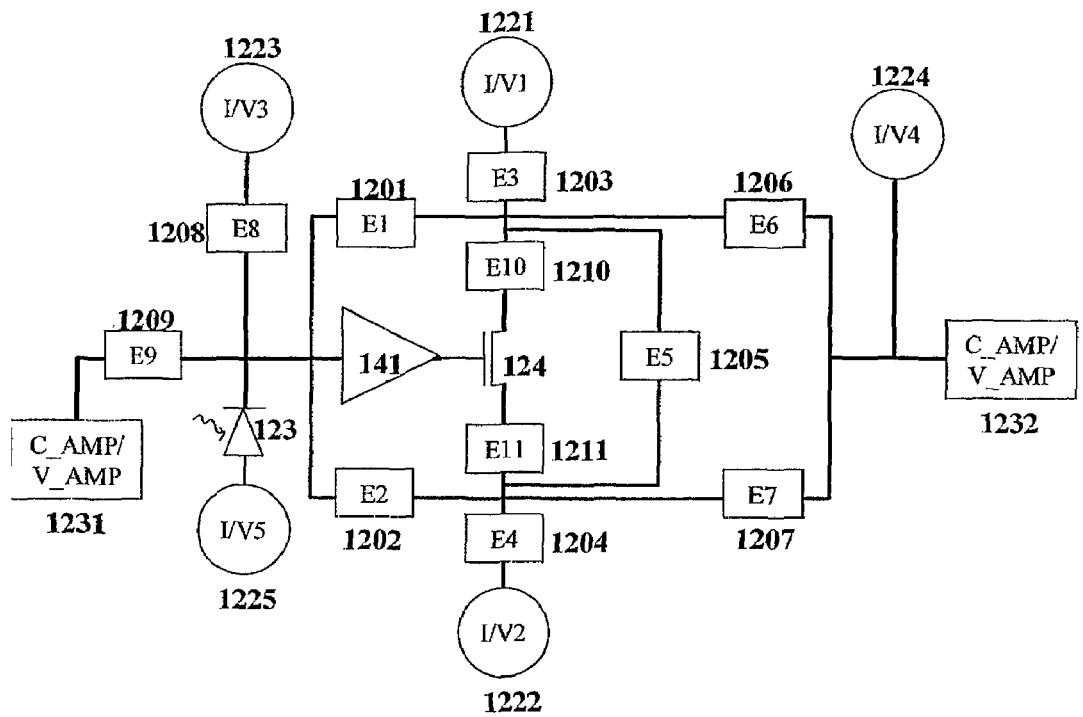
FIG. 14 illustrates other generalized imaging architecture embodiments according to the present invention.
Figure 15:
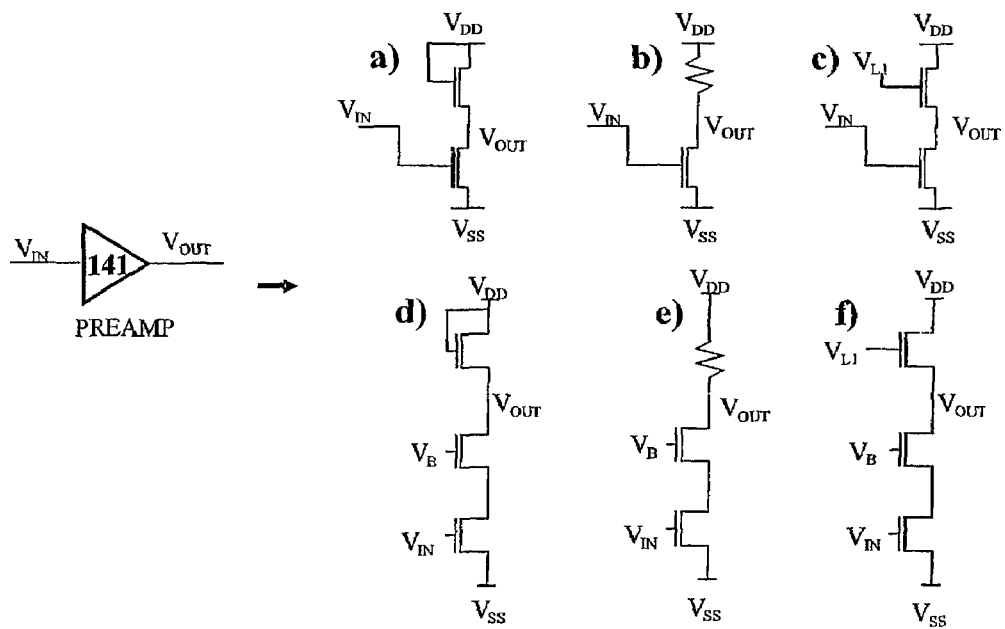
FIG. 15a to FIG. 15f illustrate pre-amplification stages according to embodiments of the present invention.

The pre-amplification stage can be incorporated into the generalized circuit of FIG. 13 as illustrated in FIG. 14. Pre-amplifier 141 forms the first amplification stage and AMP transistor 124 forms the second amplification stage.

FIG. 15a to FIG. 15f illustrate various one-stage implementations of pre-amplifier 141, namely a saturated load amplifier, a resistive load amplifier, a linear load amplifier, a saturated load cascode amplifier, a resistive load cascode amplifier, and a linear load cascode amplifier, respectively. VL1 and VB are bias voltages as would be readily understood.

Other implementations are also possible and can be substituted as would be readily understood by a worker skilled in the art.

Figure 2A:
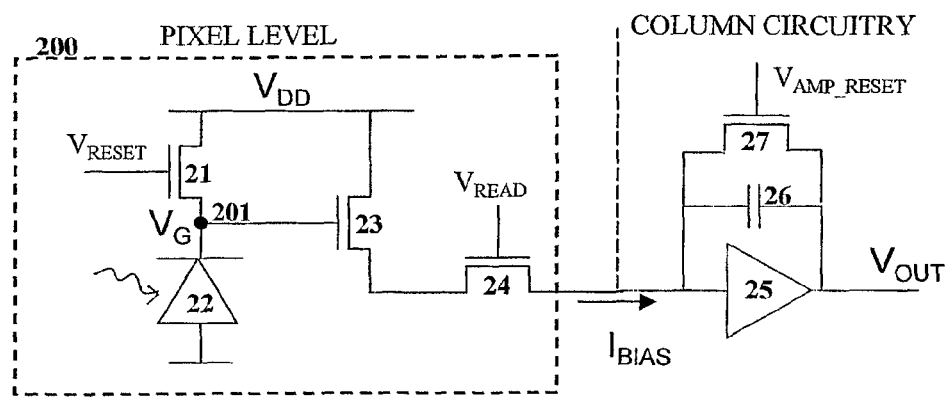
FIG. 2a illustrates a current mediated active pixel sensor (C-APS) according to the prior art.
Figure 2B:
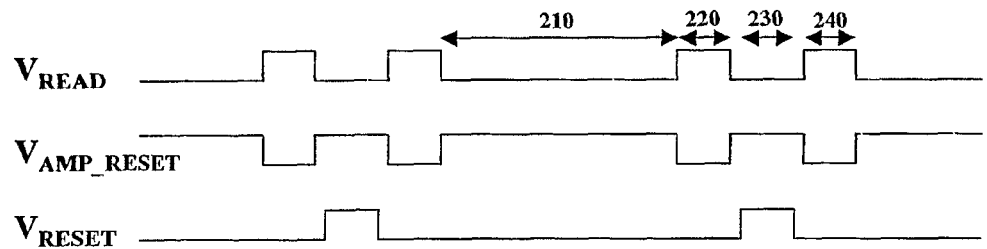
Figure 3:
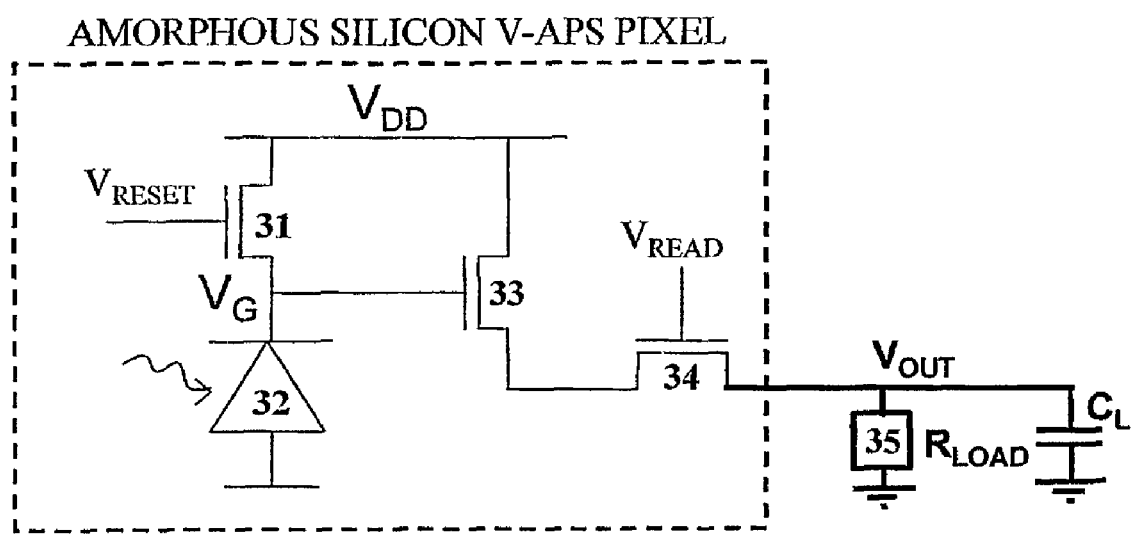
FIG. 3 illustrates a voltage mediated active pixel sensor (V-APS) according to the prior art.
Figure 16:
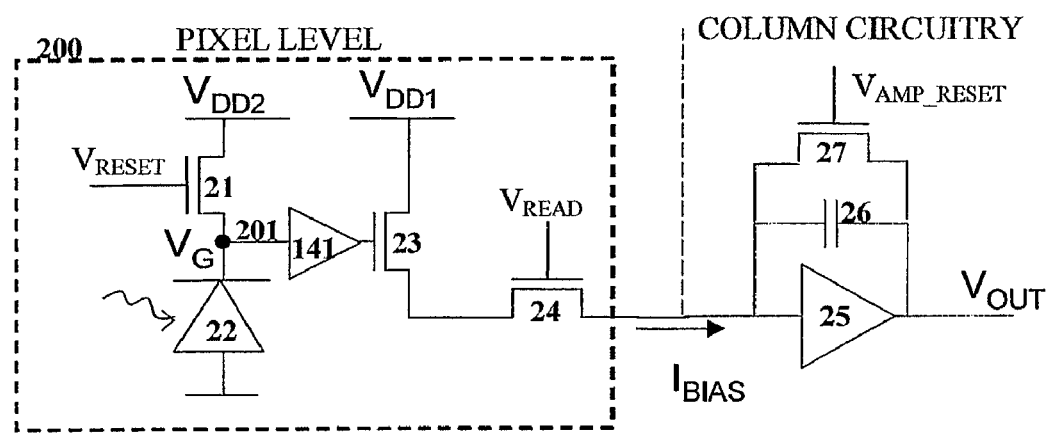
FIG. 16 illustrates an imaging architecture according to one embodiment of the present invention in which a three transistor pixel and a pre-amplification stage are implemented.

FIG. 16 illustrates one embodiment of the present invention in which pre-amplification stage 141 is implemented. This embodiment is similar to that of FIG. 2a, however a larger gain can be achieved with addition of amplification stage 141. This embodiment can also be operated using the timing diagram of FIG. 2b, for example.

Figure 17A:
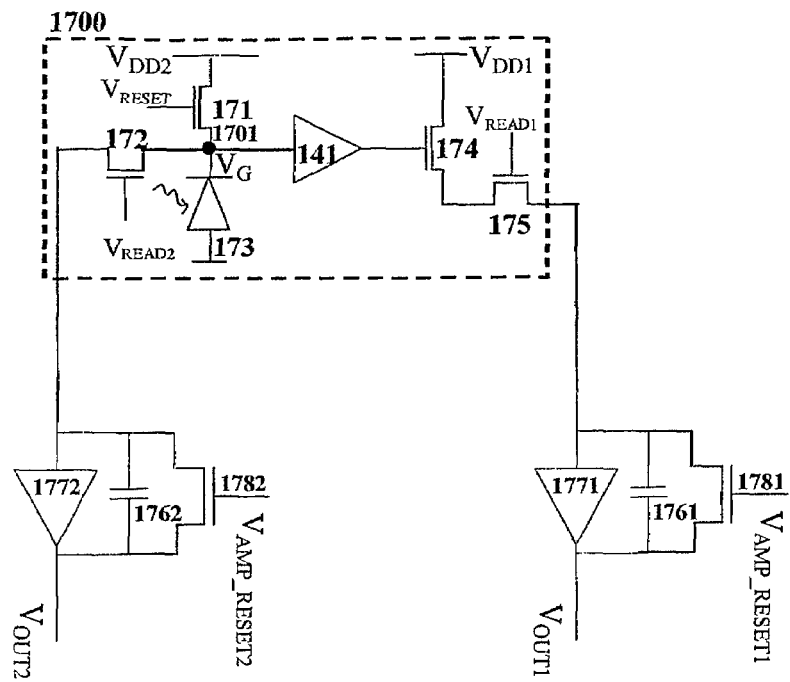
FIG. 17 illustrates an imaging architecture according to one embodiment of the present invention in which a four transistor, dual mode pixel and a pre-amplification stage are implemented.

FIG. 17a illustrates another embodiment of the present invention in which pre-amplification stage 141 is implemented and in which the pixel can function in two modes, an amplification mode when the input signal can be relatively small, for example in applications such as low dose, real-time, x-ray fluoroscopy, and a unity gain mode when the input signal can be relatively large, for example in higher contrast imaging applications like higher energy, real-time, x-ray fluoroscopy or chest radiography. In the embodiment of FIG. 17a, RESET transistor 171, READ2 transistor 172, detector 173, AMP transistor 174, and READ1 transistor 175 are present within each pixel 1700 on the imaging panel. Charge integrator 1771, charge integrator 1772, feedback capacitor 1761, feedback capacitor 1762, AMP_RESET1 transistor 1781, and AMP_RESET2 transistor 1782 form part of the readout circuitry and are used to read out signals from the pixel, and may be off-panel components or on-panel components.

The input signal from detector 173 can be read out using either the amplification or unity gain mode, or both of these modes. Both the amplification mode and the unity gain mode can be used to readout the same input signal since during the amplification mode the signal readout is essentially 'non-destructive' to the input signal, and therefore the input signal can remain available for subsequent readout in the unity gain mode. Due to the 'destructive' nature of the readout during the unity gain mode, this mode of readout is typically performed subsequent to the amplification mode readout. To operate the sensor solely in the amplification mode for small, noise vulnerable, input signal acquisition, READ2 transistor 172 is kept OFF. In this mode, the readout circuitry can function in a reset, integration and readout cycle. To operate the sensor solely in the unity gain mode, READ1 transistor 175 and RESET transistor 171 are kept OFF and the readout circuitry can function in a reset/readout cycle and an integration cycle.

Figure 17B:
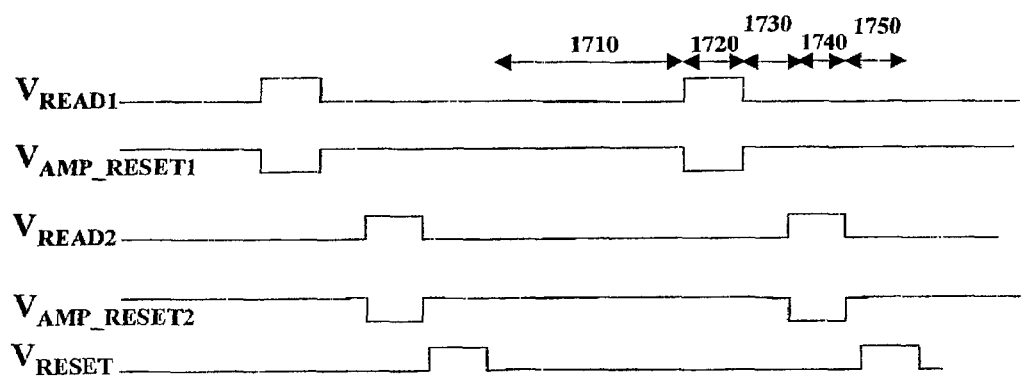

FIG. 17b illustrates an example of a timing diagram for a sequence in which each input signal from detector 173 is read out in the amplification mode followed by the unity gain mode. In this sequence, five cycles are used, namely, an integration cycle 1710, an amplification mode readout cycle 1720, a charge amplifier reset cycle 1730, a unity gain mode readout cycle 1740 and a reset cycle 1750. As would be readily understood by a worker skilled in the art, subsequent signal processing methods can be used to interpret the readout circuitry output signals. For example, where the input signal is outside the dynamic range of a particular mode, this would be appropriately interpreted by the signal processing means.

During the integration cycle 1710, READ2 transistor 172, READ1 transistor 175 and RESET transistor 171 are kept OFF while AMP_RESET1 transistor 1781 and AMP_RESET2 transistor 1782 are kept ON. Photons incident upon detector 173 result in the generation of electron-hole pairs that discharge, or charge, the capacitance $C_{DETECTOR}$ of detector 173 and thus reduce, or increase, the voltage at node 1701, $V_G$, by an amount $\Delta V_G$. $C_{DETECTOR}$ is the capacitance at node 1701 and comprises the detector capacitance and any storage capacitors that may be used.

The amplification mode readout cycle 1720 follows the integration cycle 1710 and during this amplification mode readout cycle, READ1 transistor 175 is turned ON, RESET transistor 171 is kept OFF, READ2 transistor 172 is kept OFF, AMP_RESET2 transistor 1782 is kept ON and the AMP_RESET1 transistor 1781 is turned OFF. Thus, a current, $I_{BIAS} \pm \Delta I_{BIAS}$, that is proportional to $V_G \pm \Delta V_G$ flows in the AMP transistor 174 and READ1 transistor 175 branch. The current, $I_{BIAS} \pm \Delta I_{BIAS}$ is then integrated by charge amplifier 1771 to obtain and store an output voltage, $V_{OUT1}$ on the amplifier feedback capacitor 1761. $V_{OUT1}$ represents the amplified input signal that can be subsequently recorded and manipulated by signal processors, as would be readily understood by a worker skilled in the art.

The charge amplifier reset cycle 1730 follows the amplification mode readout cycle 1720 where, during the charge amplifier reset cycle READ1 transistor 175 is turned OFF, RESET transistor 171 is kept OFF, READ2 transistor 172 is kept OFF, AMP_RESET2 transistor 1782 is kept ON and the AMP_RESET1 transistor 1781 is turned ON. Thus, the output for charge amplifier 1771 is reset. The charge amplifier reset cycle may only be needed when there is an adjacent pixel that has multiplexed its READ2 transistor output with the READ1 transistor 175 output of the current pixel 1700 as would be readily understood by a worker skilled in the art.

The unity gain mode readout cycle 1740 follows the charge amplifier reset cycle 1730 and during this unity gain mode readout cycle, READ2 transistor 172 is turned ON, RESET transistor 171 is kept OFF, READ1 transistor 175 is kept OFF, AMP RESET1 transistor 1781 is kept ON and AMP_RESET2 transistor 1782 is turned OFF. Here, the voltage $V_G$ at node 1701 is transferred and stored on the feedback capacitor 1761 and appears as an output voltage $V_{OUT2}$. $V_{OUT2}$ represents the input signal with a unity gain that can be recorded by subsequent signal processors, as would be readily understood by a worker skilled in the art. In a further embodiment, some gain may be applied to the input signal in the unity gain mode by using appropriate values for feedback capacitor 1762.

The reset cycle 1750 occurs subsequent to the unity gain mode readout cycle 1740 where in this reset cycle RESET transistor 171 is pulsed ON and $C_{DETECTOR}$ is charged or discharged to reset the voltage at node 1701 to $V_G$ while RESET transistor 171 is ON. During this reset cycle, READ2 transistor 172 is turned OFF, READ1 transistor 175 is kept OFF, AMP_RESET2 transistor 1782 is turned ON and AMP_RESET1 transistor 1781 is kept ON.

The pixel output in the embodiment of FIG. 17a can be linear for relatively small and large input signals, therefore the effect of non-uniformities in the imager fabrication process, transistor metastability, and external circuit non-uniformity can be mitigated by the use of standard double sampling and offset-and-gain correction techniques commonly applied in imaging as would be readily understood.

Figure 18:
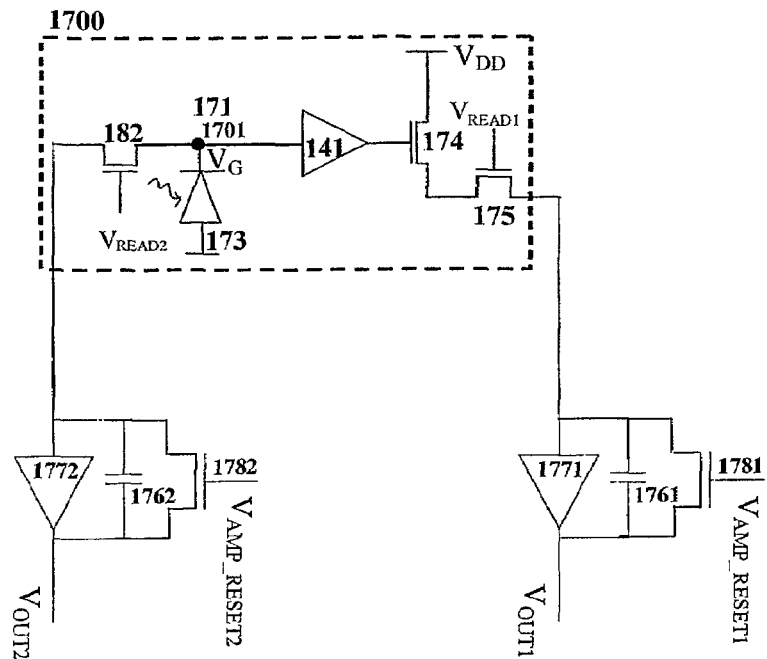
FIG. 18 illustrates an imaging architecture according to one embodiment of the present invention in which a three transistor, dual mode pixel and a pre-amplification stage are implemented.

FIG. 18 illustrates another embodiment of the present invention in which pre-amplification stage 141 is implemented and is similar to the embodiment of FIG. 17 except that RESET transistor 171 and READ2 transistor 142 have been multiplexed using READ2 transistor 182.

Figure 19:
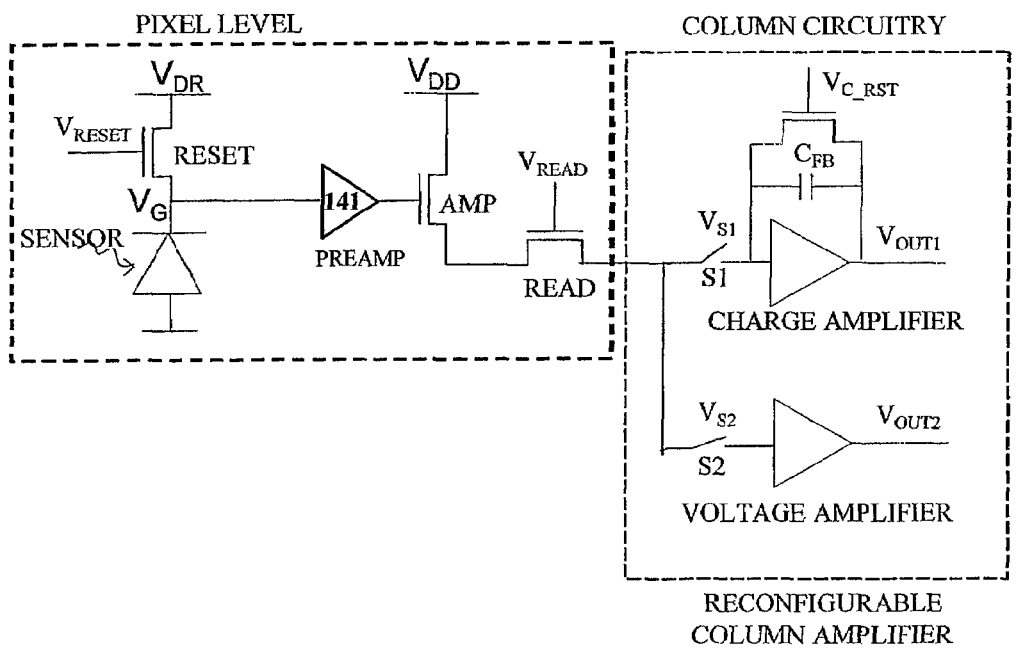
FIG. 19 illustrates an imaging architecture according to one embodiment of the present invention in which a C-APS and V-APS as well as a pre-amplification stage have been implemented in a dual mode.

FIG. 19 illustrates yet another embodiment of the present invention in which pre-amplification stage 141 is implemented. In this embodiment a voltage-mediated active pixel sensor (V-APS) and a current-mediated active pixel sensor (C-APS) have been combined to function in a dual mode configuration, namely an amplification mode and a unity gain mode. In this embodiment pre-amplification stage 141 provides gain in both modes of operation.

Figure 20:
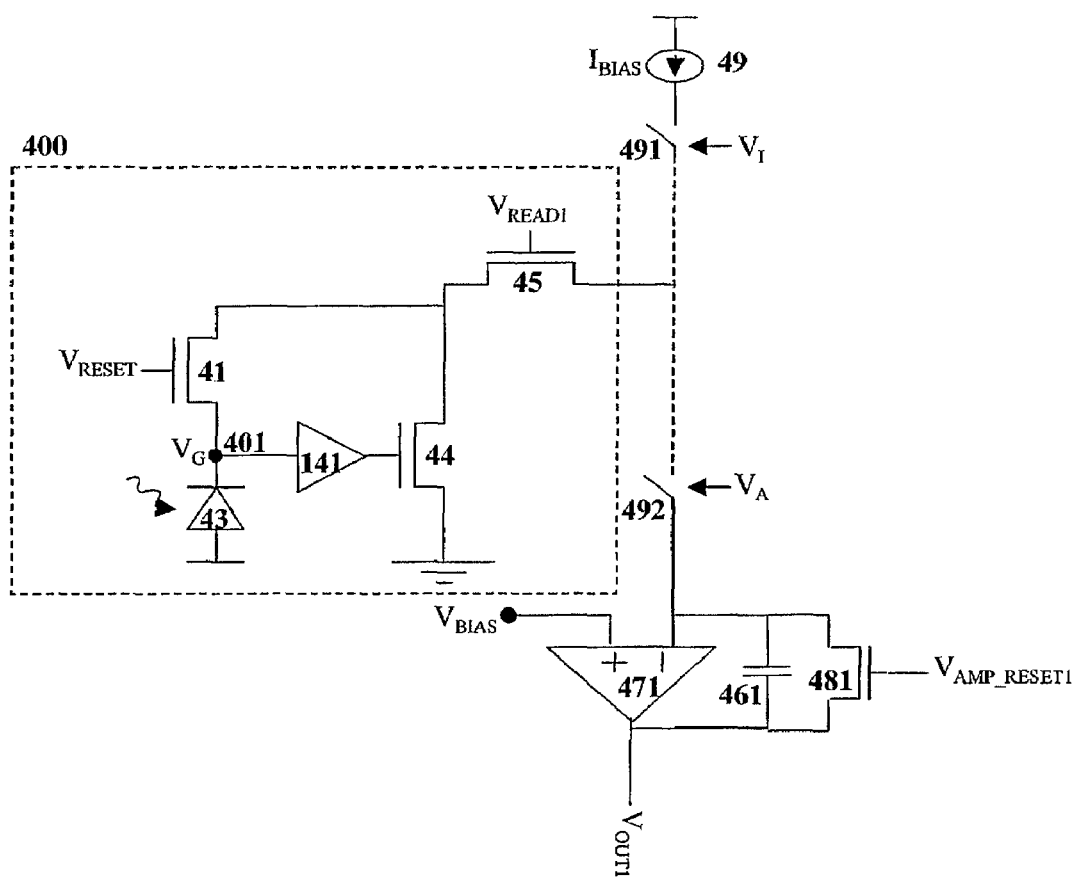
FIG. 20 illustrates an imaging architecture according to one embodiment of the present invention comprising a three transistor pixel implementation and in which a pre-amplification stage is implemented.

FIG. 20 illustrates another embodiment of the present invention in which pre-amplification stage 141 is implemented, and is similar to the embodiment of FIG. 4a and can function using the timing diagram of FIG. 4b, for example.

Figure 21:
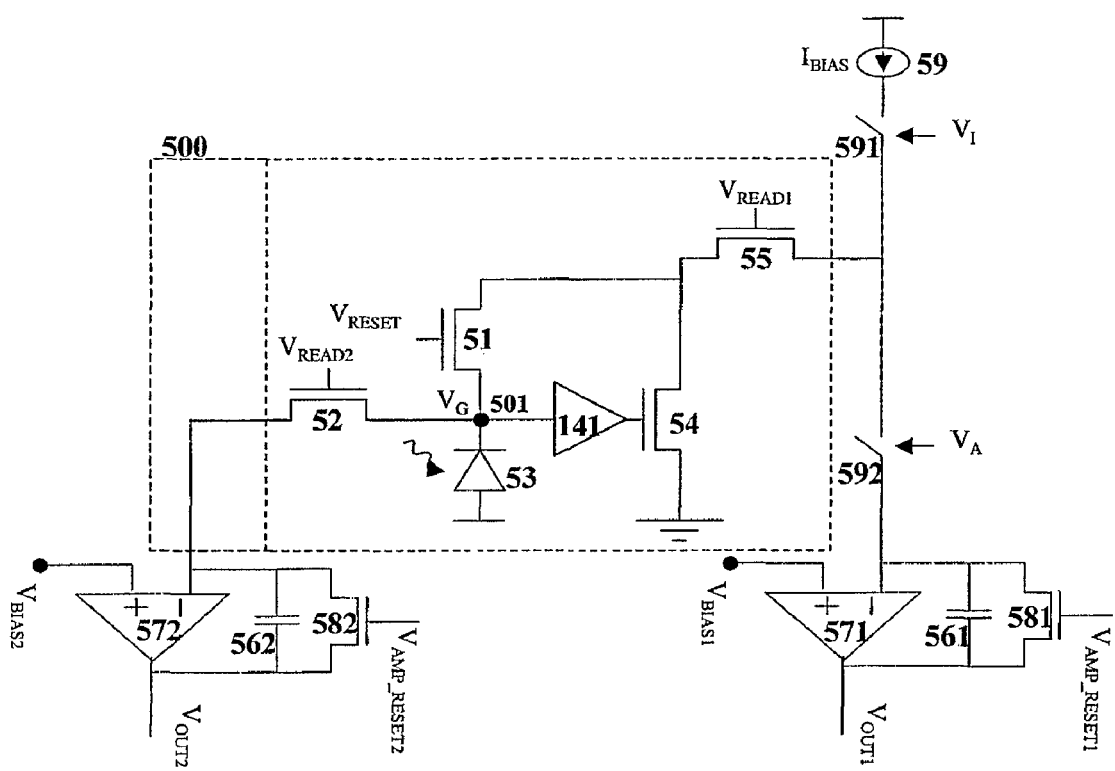
FIG. 21 illustrates an imaging architecture according to one embodiment of the present invention comprising a four transistor, dual mode pixel implementation and in which a pre-amplification stage is implemented.

FIG. 21 illustrates another embodiment of the present invention in which pre-amplification stage 141 is implemented, and is similar to the embodiment of FIG. 5a and can function using the timing diagram of FIG. 5b, for example.

Figure 22:
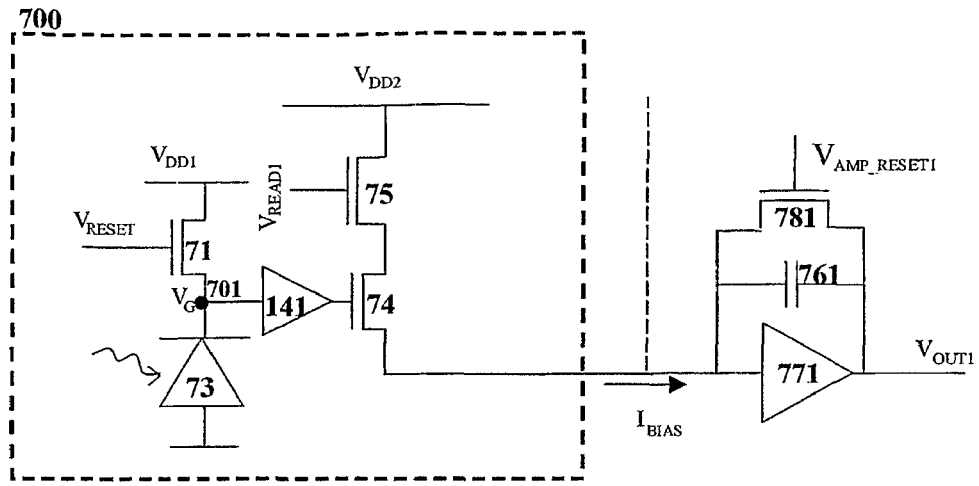
FIG. 22 illustrates an imaging architecture according to another embodiment of the present invention comprising a three transistor pixel implementation and in which a pre-amplification stage is implemented.

FIG. 22 illustrates another embodiment of the present invention in which pre-amplification stage 141 is implemented, and is similar to the embodiment of FIG. 7a and can function using the timing diagram of FIG. 7b, for example.

Figure 23:
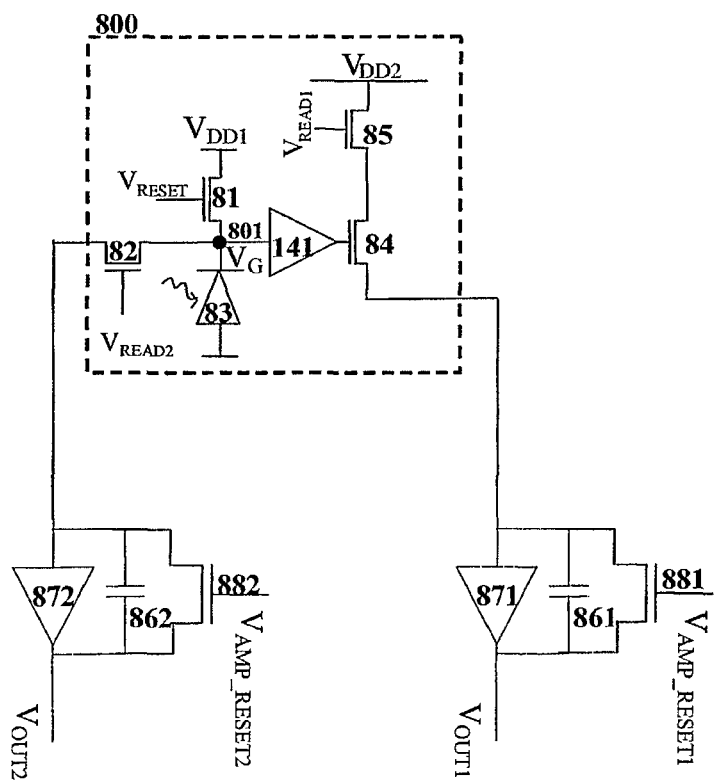
FIG. 23 illustrates an imaging architecture according to another embodiment of the present invention comprising a four transistor, dual mode pixel implementation and in which a pre-amplification stage is implemented.

FIG. 23 illustrates another embodiment of the present invention in which pre-amplification stage 141 is implemented, and is similar to the embodiment of FIG. 8a and can function using the timing diagram of FIG. 8b, for example.

Figure 24:
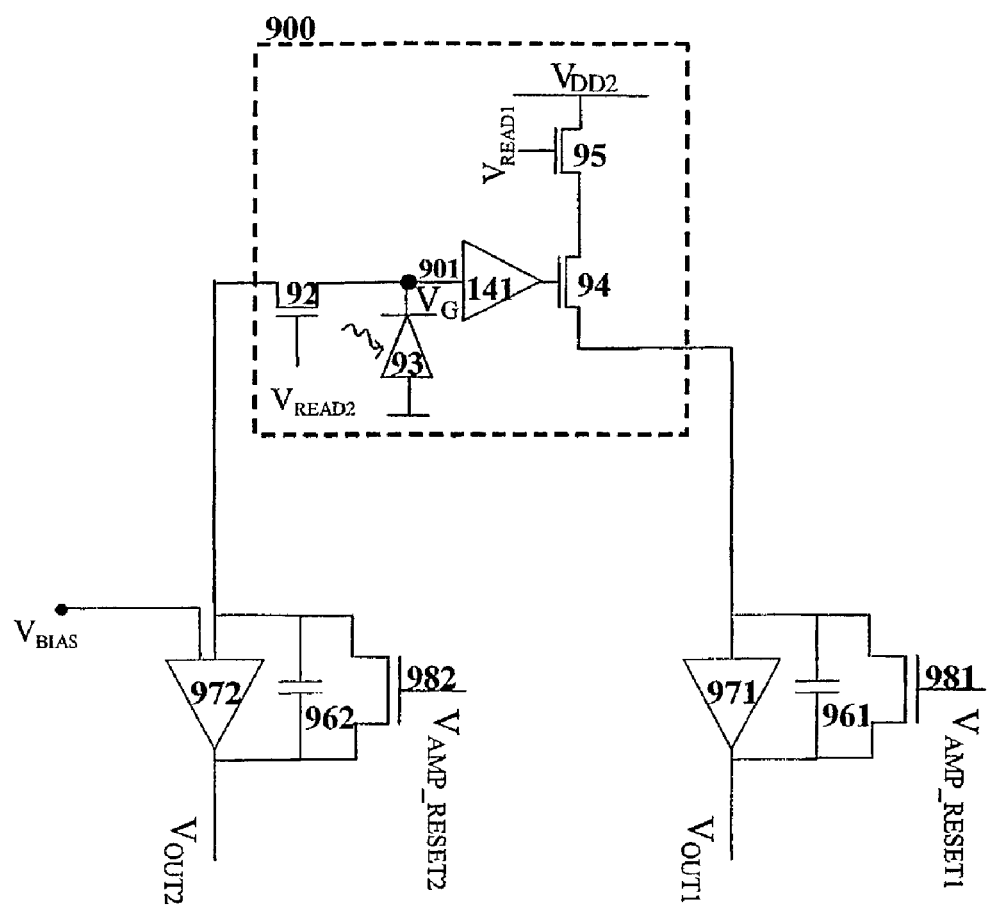
FIG. 24 illustrates an imaging architecture according to another embodiment of the present invention comprising a three transistor, dual mode pixel implementation and in which a pre-amplification stage is implemented.

FIG. 24 illustrates another embodiment of the present invention in which pre-amplification stage 141 is implemented, and is similar to the embodiment of FIG. 9a and can function using the timing diagram of FIG. 9b, for example.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A digital imaging apparatus comprising:
   (a) a detector for generating a first signal in response to photons incident thereupon; and
   (b) readout circuitry coupled to said detector for receiving said first signal and for generating a second signal representative of said first signal, said readout circuitry comprising a first on-pixel amplifier physically located on a pixel of the digital imaging apparatus, the first on-pixel amplifier configured to receive a controllable current from off pixel, the first on-pixel amplifier further configured to generate a current or charge representative of the first signal, wherein magnitude of the controllable current affects magnitude of current flowing through the first on-pixel amplifier;
   wherein said second signal is subsequently output from said digital imaging apparatus;
   wherein said readout circuitry further comprises one or more transistors for resetting said second signal to a predetermined value.

2. The digital imaging apparatus according to claim 1, wherein said second signal is representative of an amplified first signal.

3. The digital imaging apparatus according to claim 2, wherein the readout circuitry includes two or more on-pixel transistors.

4. The digital imaging apparatus according to claim 1, wherein said readout circuitry further comprises one or more transistors for output of said second signal.

5. The digital imaging apparatus according to claim 1, wherein said readout circuitry further comprises one or more transistors for output of said second signal and for resetting said second signal to a predetermined value.

6. The digital imaging apparatus according to claim 1, wherein said readout circuitry further comprises one or more devices selected from the group comprising transistors, resistors, capacitors, inductors and power sources.

7. The digital imaging apparatus according to claim 1, wherein said first on-pixel amplifier is a single transistor.

8. The digital imaging apparatus according to claim 7, wherein said first on-pixel amplifier further comprises one or more devices selected from the group comprising transistors, resistors, capacitors, inductors and power sources.

9. The digital imaging apparatus according to claim 1, wherein said readout circuitry further comprises a second amplifier.

10. The digital imaging apparatus according to claim 9, wherein said second amplifier is on-pixel.

11. The digital imaging apparatus according to claim 10, wherein said second amplifier receives said first signal, said second amplifier for generating an intermediate signal, wherein said intermediate signal is input to said first on-pixel amplifier.

12. The digital imaging apparatus according to claim 9, wherein said second amplifier is selected from the group comprising a saturated load amplifier, a resistive load amplifier, a linear load amplifier, a saturated load cascode amplifier, a resistive load cascode amplifier, and a linear load cascode amplifier.

13. The digital imaging apparatus according to claim 1, wherein said readout circuitry can operate in one or more modes of operation, thereby generating one or more second signals representative of the first signal.

14. The digital imaging apparatus according to claim 13, wherein said readout circuitry is switchable between two or more of said modes of operation, a desired mode of operation determined based on characteristics of said first signal or characteristics of said second signal.

15. The digital imaging apparatus according to claim 14, wherein the characteristics of said first signal includes magnitude of the first signal.

16. The digital imaging apparatus according to claim 15, wherein the magnitude is below a predetermined threshold and said desired mode of operation of the readout circuitry includes amplification of the first signal for generating the second signal.

17. The digital imaging apparatus according to claim 14, wherein the characteristics of said second signal includes magnitude of the second signal.

18. The digital imaging apparatus according to claim 14, wherein the characteristics of said second signal includes readout time of the second signal.

19. The digital imaging apparatus according to claim 14, wherein said readout circuitry is switchable between each of the two or more modes of operation by use of a manual switch.

20. The digital imaging apparatus according to claim 14, wherein said readout circuitry is switchable between each of the two or more modes of operation by use of an automatic switch.

21. The digital imaging apparatus according to claim 20, wherein said automatic switch includes a feedback circuit.

22. The digital imaging apparatus according to claim 20, wherein said automatic switch is responsive to a pre-programmed sequence.

23. The digital imaging apparatus according to claim 13, wherein said readout circuitry can simultaneously operate in any of said modes of operation.

24. The digital imaging apparatus according to claim 23 wherein said readout circuitry is entirely on one or more imaging panels.

25. The digital imaging apparatus according to claim 1, wherein said readout circuitry is partially on one or more imaging panels.

26. The digital imaging apparatus according to claim 13, wherein the readout circuitry includes three modes of operation.

27. The digital imaging apparatus according to claim 1, further comprising one or more additional detectors, said one or more additional detectors coupled to the readout circuitry.

28. The digital imaging apparatus according to claim 25 or 24, wherein said imaging panels are rigid or flexible.

29. The digital imaging apparatus according to claim 1, wherein said detector and said readout circuitry are fabricated in one or more planes.

30. The digital imaging apparatus according to claim 1, wherein said readout circuitry includes two or more capacitors having varying capacitance values, said two or more capacitors being arranged in series or parallel or a combination of series and parallel, said two or more capacitors configured to be switched therebetween, thereby providing two or more gains.

31. The digital imaging apparatus according to claim 1, wherein said readout circuitry, includes two or more resistors having varying resistance values, said two or more resistors being arranged in series or parallel or a combination of series and parallel, said two or more resistors configured to be switched therebetween, thereby providing two or more gains.

32. The digital imaging apparatus according to claim 1, wherein the readout circuitry comprises one or more transistors, said transistors being selected from the group comprising amorphous silicon TFTs, poly-crystalline silicon TFTs, micro-crystalline TFTs, nano-crystalline silicon TFTs and crystalline silicon transistors.

33. The digital imaging apparatus according to claim 1, wherein the readout circuitry comprises one or more transistors, said transistors being characterised as n-type, p-type or ambi-polar.

34. The digital imaging apparatus according to claim 1, wherein said detector is a gas detector or a solid-state detector.

35. The digital imaging apparatus according to claim 1, wherein said detector is a direct detection detector or an indirect detection detector.

36. The digital imaging apparatus according to claim 35, wherein said direct detection detector is fabricated with materials selected from the group comprising amorphous selenium, cadmium zinc telluride, silicon, germanium and amorphous silicon.

37. The digital imaging apparatus according to claim 35, wherein said indirect detection detector is fabricated with materials selected from the group comprising amorphous selenium, silicon, germanium, caesium iodide, gadolinium oxysulphide and amorphous silicon.

38. The digital imaging apparatus according to claim 1, wherein the controllable current is configured at least in part as a signal for switching the first on-pixel amplifier between two or more states, the two or more states including an amplification state.

39. The digital imaging apparatus according to claim 38, wherein the two or more states further includes a standby state.

40. The digital imaging apparatus according to claim 1, wherein the controllable current is configured to limit current supplied to the first on-pixel amplifier to a predetermined maximum.

41. The digital imaging apparatus according to claim 1, wherein the controllable current is configured using an independently programmable current source.

42. A digital imaging system comprising an array of digital imaging apparatuses, each digital imaging apparatus comprising:
(a) a detector for generating a first signal in response to photons incident thereupon; and
(b) readout circuitry coupled to said detector for receiving said first signal and for generating a second signal representative of said first signal, said readout circuitry comprising a first on-pixel amplifier physically located on a pixel of the digital imaging apparatus, the first on-pixel amplifier configured to receive a controllable current from off pixel, the first on-pixel amplifier further configured to generate a current or charge representative of the first signal, wherein magnitude of the controllable current affects magnitude of current flowing through the first on-pixel amplifier;

wherein said second signal is subsequently output from said digital imaging apparatus;

wherein said readout circuitry further comprises one or more transistors for resetting said second signal to a predetermined value.

43. The digital imaging system according to claim 42, wherein a particular group of two or more digital imaging apparatuses has a common portion of the readout circuitry.

44. The digital imaging system according to claim 42, said system further comprising multiplexing circuitry enabling signals to be multiplexed to the common portion of the readout circuitry.

45. The digital imaging system according to 44, wherein said multiplexing circuitry includes one or more multiplexers.

46. The digital imaging system according to 44, wherein said multiplexing circuitry includes one or more switching circuits.

47. The digital imaging apparatus according to claim 44, wherein limiting current supplied to the first on-pixel amplifier to the predetermined maximum prevents saturation of a charge amplifier operatively coupled thereto.

48. A method for digital imaging comprising the steps of:
a) detecting by a detector photons incident thereupon;
b) generating by the detector a first signal in response to the photons;
c) receiving said first signal by readout circuitry coupled to the detector;
d) generating a second signal representative of the first signal by the readout circuitry, said readout circuitry including a first on-pixel amplifier physically located on a pixel of the digital imaging apparatus, the first on-pixel amplifier configured to receive a controllable current from off pixel, the first on-pixel amplifier further configured to generate a current or charge representative of the first signal, wherein magnitude of the controllable current affects magnitude of current flowing through the first on-pixel amplifier;
(e) transferring said second signal to a digital signal processor; and
(f) resetting said second signal to a predetermined value by one or more transistors of said readout circuitry.

* * * * *